(12) United States Patent
Seki et al.

(10) Patent No.: US 11,440,449 B2
(45) Date of Patent: Sep. 13, 2022

(54) SEAT AIR-CONDITIONER

(71) Applicant: DENSO CORPORATION, Kariya (JP)

(72) Inventors: Hideki Seki, Kariya (JP); Masafumi Kawashima, Kariya (JP); Shuji Ito, Kariya (JP); Hironobu Murakami, Kariya (JP); Takahisa Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/318,569

(22) Filed: May 12, 2021

(65) Prior Publication Data

US 2021/0261025 A1 Aug. 26, 2021

Related U.S. Application Data

(63) Continuation of application No. PCT/JP2019/040054, filed on Oct. 10, 2019.

(30) Foreign Application Priority Data

Nov. 26, 2018 (JP) .............................. JP2018-220165

(51) Int. Cl.
*B60N 2/56* (2006.01)
*A47C 31/00* (2006.01)

(52) U.S. Cl.
CPC ........... *B60N 2/565* (2013.01); *B60N 2/5685* (2013.01)

(58) Field of Classification Search
CPC .......... B60H 1/247; B60H 1/242; B60H 1/00; B60H 1/00285; A47C 7/74; B60N 2/5642; B60N 2/5657; B60N 2/5635; B60N 2/565; B60N 2/5621; B60N 2/5685; B60N 2/5678
See application file for complete search history.

(56) References Cited

U.S. PATENT DOCUMENTS

| | | | | |
|---|---|---|---|---|
| 6,478,369 B1 * | 11/2002 | Aoki | ..................... | B60N 2/5657 |
| | | | | 297/344.13 |
| 6,685,553 B2 * | 2/2004 | Aoki | ..................... | B60N 2/5635 |
| | | | | 297/180.14 |
| 6,736,452 B2 * | 5/2004 | Aoki | ..................... | B60N 2/5657 |
| | | | | 297/180.13 |

(Continued)

FOREIGN PATENT DOCUMENTS

| JP | 2010094146 A | 4/2010 |
|---|---|---|
| JP | 6094373 B2 | 3/2017 |
| JP | 2018-127098 A | 8/2018 |

*Primary Examiner* — Shin H Kim
(74) *Attorney, Agent, or Firm* — Harness, Dickey & Pierce, P.L.C.

(57) ABSTRACT

A seat air-conditioner includes an inlet portion, a blower, and a door device. The inlet portion is disposed inside a seat and defines a first inlet and a second inlet. The blower is disposed inside the seat. The door device is configured to be moved to open the first inlet while closing the second inlet and to close the first inlet while opening the second inlet. The first inlet is arranged such that an air drawn into the seat through a passenger supporting portion of the seat is drawn into the blower through the first inlet. The second inlet is arranged such that an air drawn into the seat through a portion of the seat other than the passenger supporting portion is more likely to be drawn into the second inlet than into the first inlet.

20 Claims, 20 Drawing Sheets

(56) References Cited

U.S. PATENT DOCUMENTS

| | | | | |
|---|---|---|---|---|
| 6,848,742 B1* | 2/2005 | Aoki | ................... | B60N 2/5635 |
| | | | | 454/120 |
| 7,261,372 B2* | 8/2007 | Aoki | ................... | B60N 2/5642 |
| | | | | 297/180.13 |
| 10,625,643 B2* | 4/2020 | Iacovone | ............. | B60N 2/5875 |
| 10,710,480 B2* | 7/2020 | Iacovone | ............. | B60N 2/5635 |
| 2004/0090093 A1* | 5/2004 | Kamiya | ................ | B60N 2/5628 |
| | | | | 297/180.14 |
| 2006/0138812 A1* | 6/2006 | Aoki | ................... | B60N 2/5635 |
| | | | | 297/180.14 |
| 2012/0129439 A1* | 5/2012 | Ota | ........................ | B60H 1/242 |
| | | | | 454/120 |
| 2015/0266404 A1 | 9/2015 | Sakane et al. | | |
| 2016/0272038 A1* | 9/2016 | Tanaka | ..................... | B60N 2/56 |
| 2018/0170223 A1* | 6/2018 | Wolas | ................... | B60N 2/5678 |
| 2018/0361892 A1* | 12/2018 | Iacovone | ................. | B60N 2/70 |
| 2018/0361893 A1* | 12/2018 | Iacovone | ............. | B60N 2/5657 |
| 2019/0241043 A1* | 8/2019 | Ito | ..................... | B60H 1/00742 |

* cited by examiner

| SWITCHING POSITION | DOOR CONNECTING GEAR ANGLE [DEG] | DRIVE DOOR ANGLE [DEG] | FRONT SEAT AIR VOLUME | BLOWING AIR VOLUME TOWARD REAR SEAT | BLOWER |
|---|---|---|---|---|---|
| [1] | 0 | 60 | Hi | Hi | ON |
| [2] | 34.75 | 45 | M2 | | |
| [3] | 69.5 | 30 | M1 | | |
| [4] | 102.25 | 15 | Lo | | |
| [5] | 135 | 0 | OFF | OFF | OFF |

SEAT AIR-CONDITIONER

CROSS REFERENCE TO RELATED APPLICATIONS

The present application is a continuation application of International Patent Application No. PCT/JP2019/040054 filed on Oct. 10, 2019, which designated the U.S. and claims the benefit of priority from Japanese Patent Application No. 2018-220165 filed on Nov. 26, 2018. The entire disclosures of all of the above applications are incorporated herein by reference.

TECHNICAL FIELD

The present disclosure relates to a seat air-conditioner disposed in a seat in a vehicle interior.

BACKGROUND

The seat air-conditioner is disposed in a seat of the vehicle and configured to blow out an air in a rearward direction of the seat in the vehicle. Thereby, the device is configured to draw air in a front area of the seat and blow the air in the rearward direction.

SUMMARY

A seat air-conditioner is disposed in a seat for a passenger in a vehicle cabin. The seat air-conditioner includes an inlet portion, a blower, and a door device. The inlet portion is disposed inside the seat and defines a first inlet and a second inlet. The blower is disposed inside the seat and configured to draw air through at least one of the first inlet and the second inlet and blow out the air in a rearward direction of the seat. The door device is configured to be moved to open the first inlet while closing the second inlet and to close the first inlet while opening the second inlet. The seat has a seat surface including a passenger supporting portion configured to support a body of the passenger. The first inlet is arranged such that an air drawn into the seat through the passenger supporting portion is drawn into the blower through the first inlet. The second inlet is arranged such that an air drawn into the seat through a portion of the seat surface other than the passenger supporting portion is more likely to drawn into the second inlet than into the first inlet.

DESCRIPTION OF EMBODIMENTS

Figure 1:
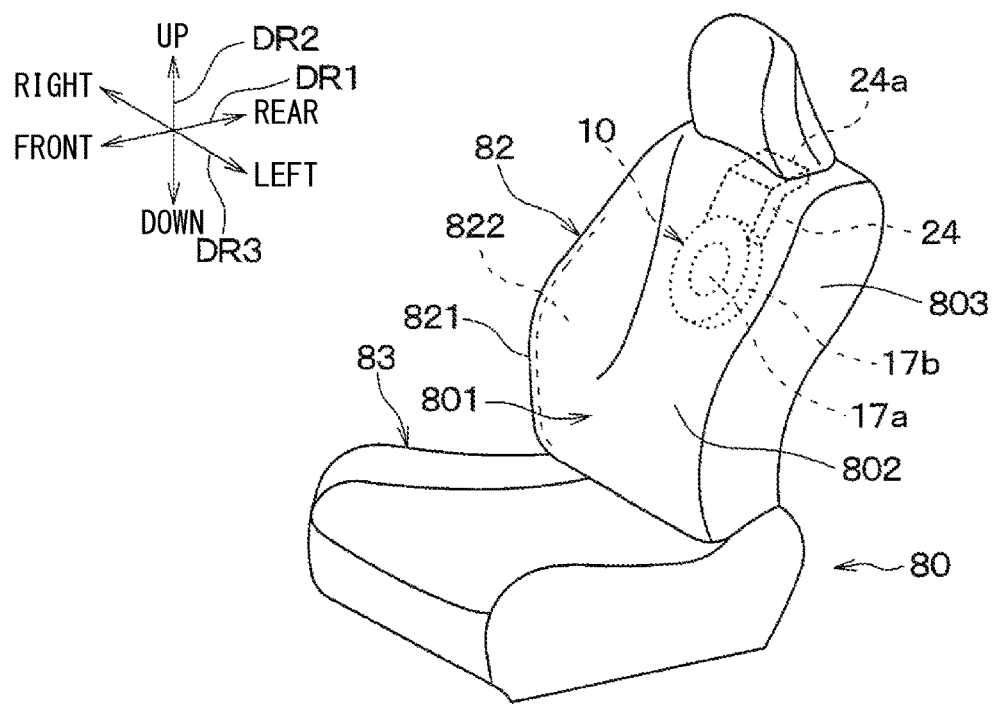
FIG. 1 is a perspective view illustrating a seat including a seat air-conditioner of a first embodiment and a position of the seat air-conditioner in the seat.

To begin with, examples of relevant techniques will be described.

A seat air-conditioner is, for example, a vehicular convection promotion device. The vehicular convection promotion device is disposed in a seat of the vehicle and configured to blow out an air in a rearward direction of the seat in the vehicle. Thereby, the device is configured to draw air in a front area of the seat and blow the air in the rearward direction.

Specifically, the vehicular convection promotion device includes a seat internal fan and a seat internal duct. The seat internal fan is a centrifugal fan disposed inside the seat that is a front seat. The seat internal duct guides the air blown out by the seat internal fan to a side outlet of the seat. The seat has a seat surface including a passenger supporting portion configured to support a passenger. The air is drawn into the seat internal fan through a seat covering material of the passenger supporting portion and blown out in the rearward direction through the seat internal duct and the seat side outlet. As a result, the blown air entrains air in the front area of the seat and circulates the air toward a rear seat.

The vehicular convection promotion device is configured to draw air into the seat and blow the air in the rearward direction of the seat. However, in order to continue to blow out the air in the rearward direction, it is necessary to keep operating the seat internal fan and drawing the air through the passenger supporting portion of the seat.

That is, in order to stop drawing the air into the seat through the passenger supporting portion, it is necessary to stop blowing the air in the rearward direction. Further, in order to decrease an amount of air drawn into the seat through the passenger supporting portion, it is necessary to decrease an amount of air blown out in the rearward direction. As described above, in the vehicular convection promotion device, it is difficult to separately adjust the amount of air drawn into the seat through the passenger supporting portion and the amount of air blown out in the rearward direction. As a result of detailed studies by the inventors, the problems as described above have been found.

In view of the above points, a seat air-conditioner capable of adjusting an amount of air drawn into a seat through a passenger supporting portion while maintaining the amount of air blown out in a rearward direction of the seat is provided.

According to one aspect of the present disclosure, a seat air-conditioner is disposed in a seat for a passenger in a vehicle cabin. The seat air-conditioner includes an inlet portion, a blower, and a door device. The inlet portion is disposed inside the seat and defines a first inlet and a second inlet. The blower is disposed inside the seat and configured to draw air through at least one of the first inlet and the second inlet and blow out the air in a rearward direction of the seat. The door device is configured to be moved to open the first inlet while closing the second inlet and to close the first inlet while opening the second inlet. The seat has a seat surface including a passenger supporting portion configured to support a body of the passenger. The first inlet is arranged such that an air drawn into the seat through the passenger supporting portion is drawn into the blower through the first inlet. The second inlet is arranged such that an air drawn into the seat through a portion of the seat surface other than the passenger supporting portion is more likely to drawn into the second inlet than into the first inlet.

In this way, the blower can draw the air not only when the first inlet is open but also when the first inlet is closed. Thus, the blower can maintain the amount of air blown out in the rearward direction. When the door device is moved to open the first inlet, the amount of air drawn by the blower through the passenger supporting portion of the seat increases and when the door device is moved to close the first inlet, the amount of air drawn by the blower through the passenger supporting portion decreases. That is, it is possible to adjust the amount of the air drawn into the seat through the passenger supporting portion of the seat by operating the door device while maintaining the amount of the air blown out in the rearward direction.

Hereinafter, each embodiment will be described with reference to the drawings. In the following embodiments, the same reference numeral is given to the same or equivalent parts in the drawings.

First Embodiment

FIG. 1 is a view of a seat air-conditioner 10 of this embodiment and a seat 80 in which the seat air-conditioner 10 is disposed. The seat 80 is a vehicle seat for a passenger in a vehicle cabin. Specifically, the seat 80 in FIG. 1 is a front seat and a rear seat is provided behind the seat 80 in the vehicle. Further, there is an air blowing outlet through which a conditioned air generated by a vehicular air-conditioner in the vehicle cabin is blown out and the air blowing outlet is defined in front of the seat 80 in the vehicle. The front seat includes a driver seat and a passenger seat. The seat 80 in FIG. 1 may be any one of the driver seat and the passenger seat.

Arrows DR1, DR2, and DR3 in FIG. 1 represent directions of the vehicle in which the seat air-conditioner 10 is mounted. That is, the arrow DR1 represents a front-rear direction DR1 of the vehicle, the arrow DR2 represents an up-down direction DR2 of the vehicle, and the arrow DR3 represents a left-right direction DR3 of the vehicle, i.e. a width direction DR3 of the vehicle. The directions DR1, DR2, and DR3 intersect with each other. Specifically, the directions DR1, DR2, and DR3 are perpendicular to each other.

The seat 80 includes a seat back 82 configured to support mainly the back of the passenger seated on the seat 80 and a seat portion 83 configured to support mainly the buttocks of the passenger.

The seat back 82 has a seat back skin 821 and a seat back elastic member 822. The seat back skin 821 constitutes a surface of the seat back 82 and entirely covers an outer surface of the seat back elastic member 822. Further, the seat back skin 821 is porous to be breathable.

The seat back elastic member 822 is an elastic body made of a porous material such as urethane foam. That is, the seat back elastic member 822 has elasticity and is configured to be breathable. In the present embodiment, the seat air-conditioner 10 is provided inside the seat back 82. Therefore, for example, a part of the seat back elastic member 822 is hollowed out to dispose the seat air-conditioner 10 inside the hollowed space.

The seat portion 83 has a similar internal structure to that of the seat back 82. That is, the seat portion 83 includes a breathable skin configuring a surface of the seat portion 83 and a breathable elastic member entirely covered by the skin.

The passenger is seated on the seat 80. Thus, the seat 80 has a seat surface 801 including a passenger supporting portion 802 configured to support the body of the passenger. In the seat back 82 of the seat 80, an outer surface facing in a front direction corresponds to the passenger supporting portion 802. In the seat portion 83, an outer surface facing in an up direction corresponds to the passenger supporting portion. That is, the passenger supporting portion 802 is a surface facing the passenger seated on the seat 80.

Since the seat air-conditioner 10 of the present embodiment is disposed inside the seat back 82, the passenger supporting portion 802 corresponds to the passenger supporting portion 802 of the seat back 82. The seat surface 801 may be also referred to as a seat outer surface and the seat surface 801 includes a portion facing the passenger, a side portion 803, and a rear portion of the seat 80.

The seat air-conditioner 10 defines first inlets 17a and second inlets 17b for drawing air. As shown by arrows AR1 and AR2 in FIG. 2, the seat air-conditioner 10 can draw the air through the breathable seat back skin 821 and the seat back elastic member 822. Then, the seat air-conditioner 10 can blow out the drawn air in a rearward direction of the seat 80 as shown in an arrow AR3. The arrows AR1 in FIG. 2 indicate airflows drawn into the first inlets 17a and the arrows AR2 indicate airflows drawn into the second inlets 17b. In addition, in FIGS. 1 and 2, illustrations of the first inlets 17a and the second inlets 17b are simplified.

Figure 3:
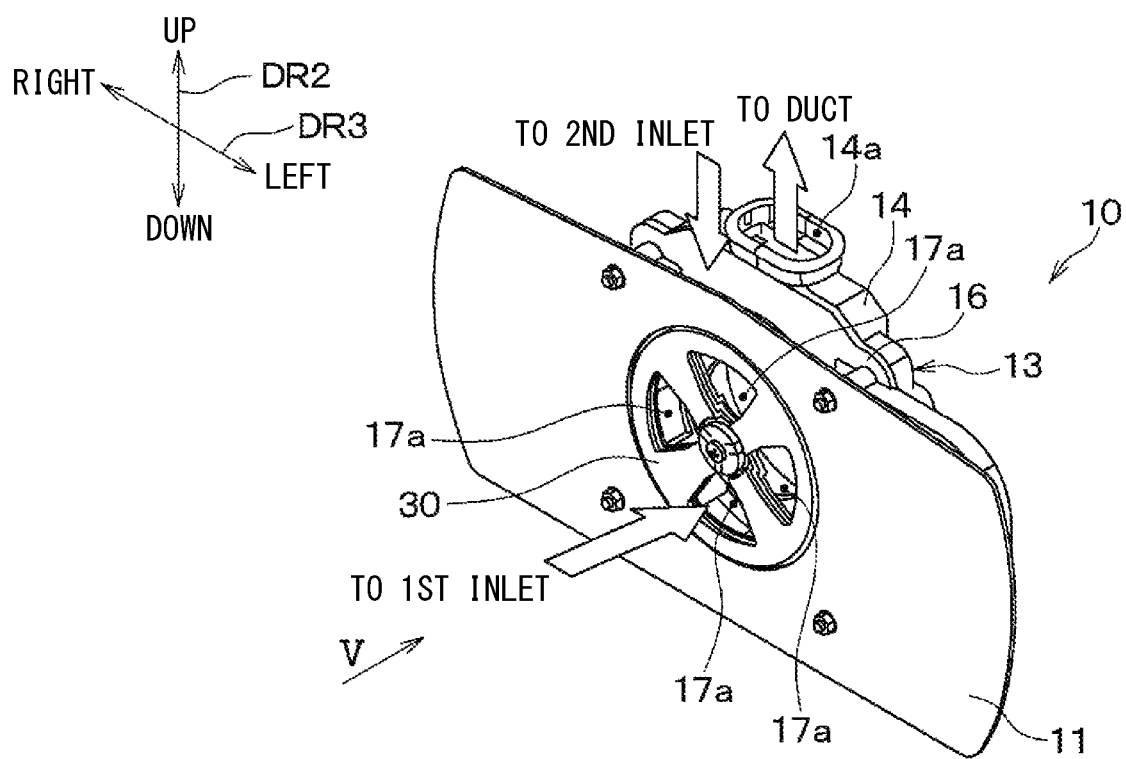
FIG. 3 is a perspective view of the seat air-conditioner of the first embodiment.
Figure 4:
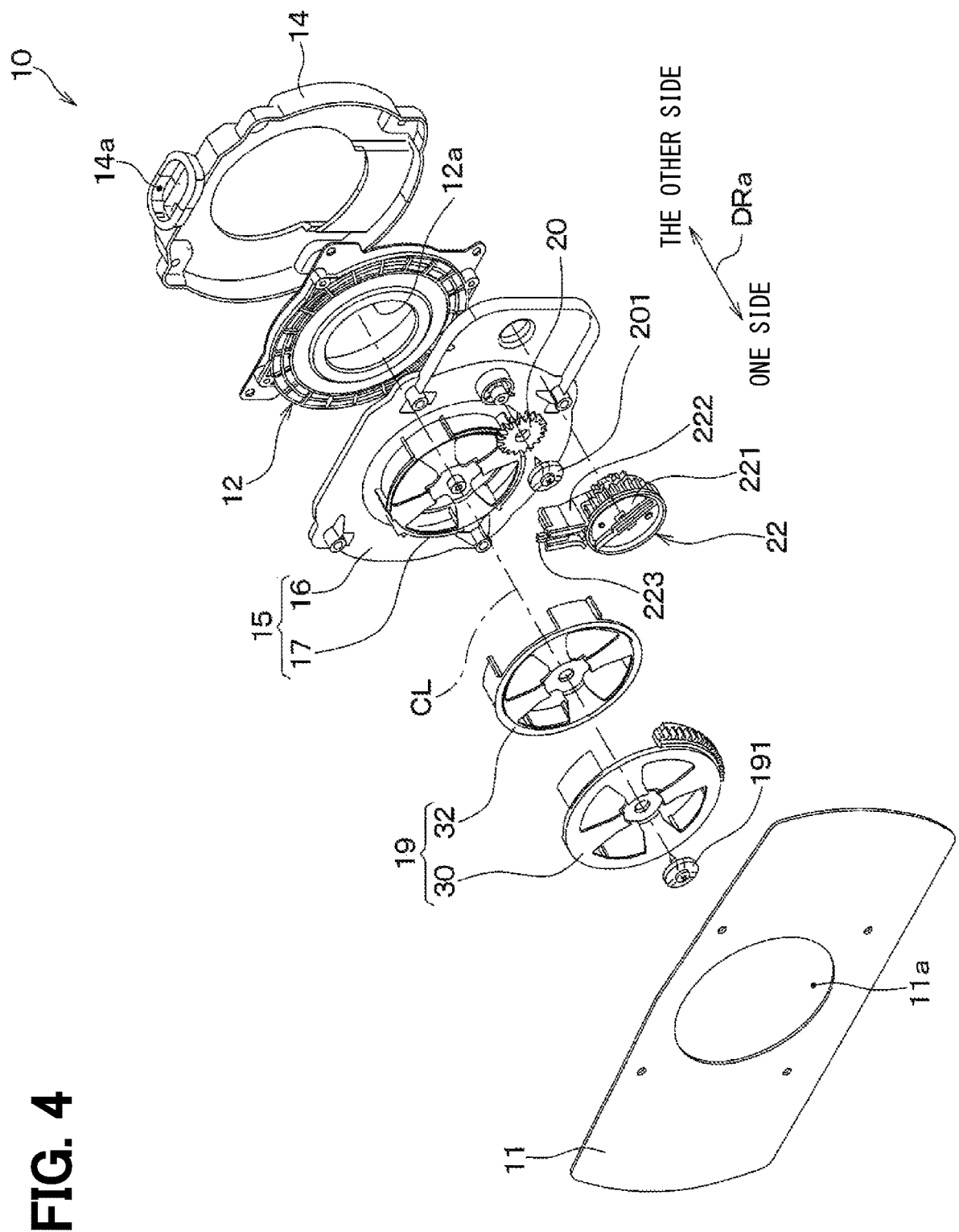
FIG. 4 is an exploded perspective view of the seat air-conditioner of the first embodiment.

As shown in FIGS. 3 and 4, the seat air-conditioner 10 includes an attachment plate 11, a blower 12, a blower casing 14, a door supporter 15, a door device 19, an intermediate gear 20, a door operating device 22, and a blower duct 24.

Figure 5:
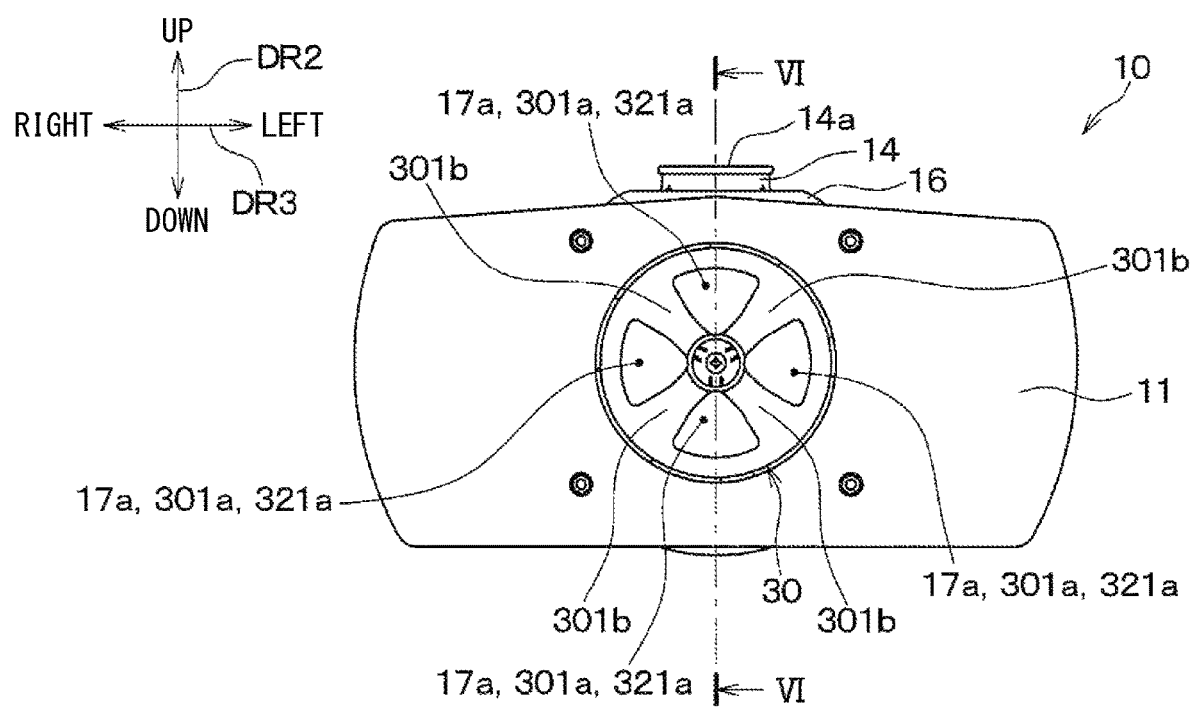
FIG. 5 is a diagram viewed in a V direction of FIG. 3.

The attachment plate 11 shown in FIGS. 3 to 5 has a plate shape along the passenger supporting portion 802 of the seat back 82 and fixed to a seat frame of the seat 80. The seat air-conditioner 10 is hold at a fixed position in the seat 80 by fixing the attachment plate 11 to the seat frame.

Figure 2:
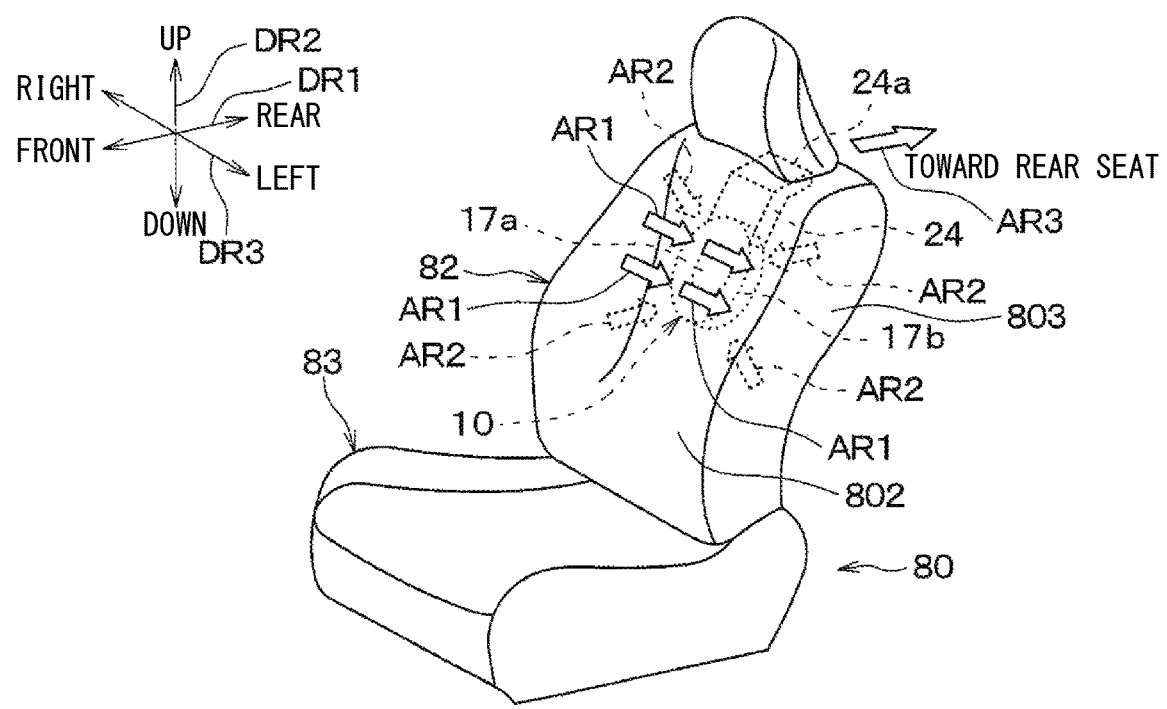
FIG. 2 is a perspective view similar to FIG. 1 illustrating an airflow drawn into the seat air-conditioner.
Figure 6:
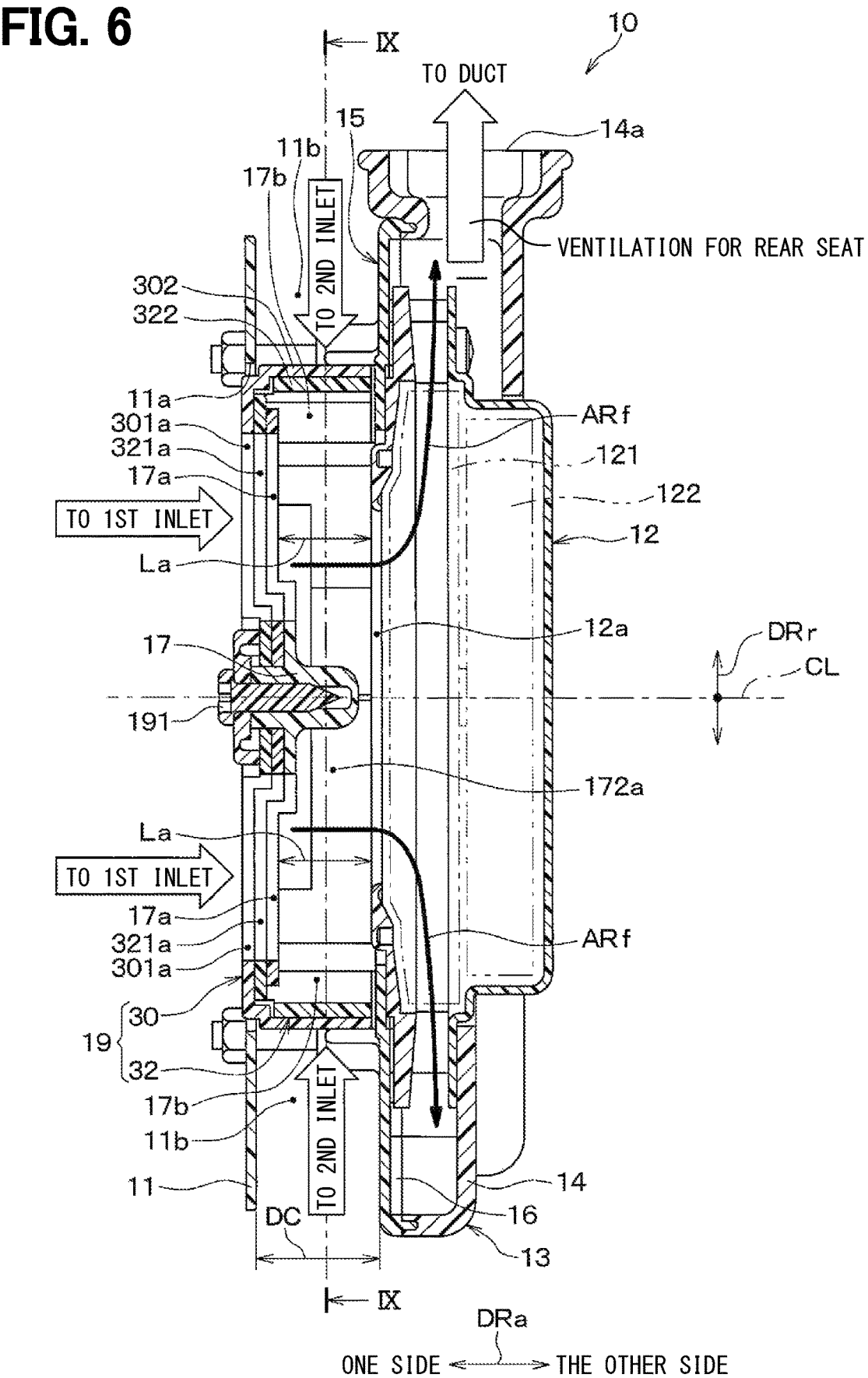
FIG. 6 is a cross-sectional view taken along a line VI-VI of FIG. 5.

Further, as shown in FIGS. 2 and 6, the attachment plate 11 extends along the passenger supporting portion 802 and is arranged between the passenger supporting portion 802 and the second inlets 17b. Therefore, the attachment plate 11 also serves as a partition wall to partition off the passenger supporting portion 802 from the second inlets 17b. Specifically, the attachment plate 11 as the partition wall is arranged between the passenger supporting portion 802 and a space 11b adjacent to the second inlets 17b through which air is drawn into the second inlets 17b.

Further, the attachment plate 11 defines a through hole 11a passing through the attachment plate 11 and the first inlets 17a are defined in the through hole 11a in a radial direction DRr. That is, the attachment plate 11 does not extend between the passenger supporting portion 802 and the first inlets 17a.

Further, the door device 19 has a part inserted into the through hole 11a. However, for example, there is a slight gap between the through hole 11a of the attachment plate 11 and the door device 19 so that the attachment plate 11 does not interfere with the operation of the door device 19. Alternatively, even if the door device 19 is in contact with the through hole 11a, a relative positional relationship between the attachment plate 11 and the door device 19 is maintained so that the contact does not restrict the door device 19 from moving.

As shown in FIGS. 4 and 6, the blower 12 is a centrifugal blower and is arranged inside the seat 80. Specifically, the blower 12 is arranged inside the seat back 82 of the seat 80.

The blower 12 has a centrifugal fan 121 which is an impeller and a motor 122 which rotates the centrifugal fan 121 when energized. For example, the centrifugal fan 121 of the present embodiment is a thin turbofan. The centrifugal fan 121 is configured to draw air in an axial direction DRa of a predetermined fan axis CL by rotating about the axis CL and blow out the drawn air outward in the radial direction DRr of the axis CL. In short, the centrifugal fan 121 is configured to generate airflows as shown in arrows ARf by rotating. The arrows ARf indicate the airflows drawn by the blower 12 through the first inlets 17a not through the second inlets 17b.

The blower 12 defines a blower inlet 12a on one side of the centrifugal fan 121 in the axial direction DRa that opens toward the passenger supporting portion 802 of the seat 80 in the axial direction DRa. In the description of the present embodiment, the axial direction DRa of the axis CL is also referred to as the axial direction DRa, the radial direction DRr of the axis CL is also referred to as the radial direction DRr, and the circumferential direction DRc about the axis CL (see FIG. 9) is also referred to as the circumferential direction DRc.

Figure 7:
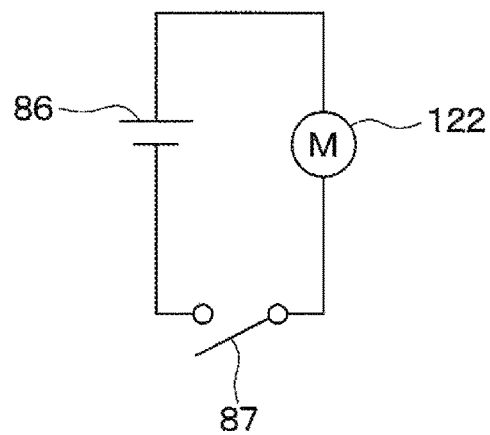
FIG. 7 is an electric circuit diagram illustrating an electric connection between a motor of a blower and a power source of a vehicle in the first embodiment.

As shown in the electric circuit diagram of FIG. 7, the motor 122 of the blower 12 is connected in series to a power supply 86 which is a DC power supply and a blower switch 87. The blower switch 87 is located between the motor 122 and the power supply 86. The blower switch 87 is a manual switch that can be switched between an ON state and an OFF state by a manual operation of the passenger and is installed at a place such as the side portion 803 of the seat 80 so that the passenger can easily operate the blower switch 87.

The motor 122 is put into an energized state (i.e., an ON state) when the blower switch 87 is turned on and into a de-energized state (i.e., an OFF state) when the blower switch 87 is turned off. In short, the blower 12 is configured to operate when the blower switch 87 is turned on and to stop when the blower switch 87 is turned off.

Therefore, the motor 122 receives a constant electric power when the blower switch 87 is turned on, outputs a rotational speed to blow a required amount of air for air-conditioning of the seat 80, and rotates the centrifugal fan 121 to output a predetermined amount of air.

As shown in FIGS. 4 and 6, the blower casing 14 constitutes a part of a blower housing 13 surrounding the blower 12 and mainly covers the other side of the blower 12 in the axial direction DRa. Further, the blower casing 14 defines a duct connecting opening 14a to which the blower duct 24 (see FIG. 2) is connected. The blower housing 13 collects the air blown into the blower housing 13 from the entire circumference of the centrifugal fan 121 and guides the air to flow into the blower duct 24 through the duct connecting opening 14a.

The door supporter 15 is a member that rotatably supports the door device 19 and is arranged inside the seat back 82. The door supporter 15 includes a housing forming portion 16 and an inlet portion 17 that defines the first inlets 17a and the second inlets 17b. The door supporter 15 is integrally formed and thus the housing forming portion 16 and the inlet portion 17 are integrally formed with each other.

The housing forming portion 16 of the door supporter 15 forms a part of the blower housing 13 and is configured to cover mainly one side of the blower 12 in the axial direction DRa. That is, the housing forming portion 16 and the blower casing 14 are connected to each other to form the blower housing 13.

As shown in FIGS. 2 and 6, the blower duct 24 has an upstream end connected to the duct connecting opening 14a of the blower casing 14 and a downstream end as a rear blowing outlet 24a. The rear blowing outlet 24a extends over the seat 80 and opens toward a rear side of the seat 80. That is, the rear blowing outlet 24a opens toward the rear seat and air is blown out toward the rear seat through the rear blowing outlet 24a.

Then, the blower housing 13 is configured to guide the air blown into the blower housing 13 by the centrifugal fan 121 of the blower 12 to the blower duct 24. Thus, the blower 12 is configured to blow the air drawn through at least one of the first inlets 17a and the second inlets 17b in the rearward direction of the seat 80 through the blower duct 24.

Figure 8:
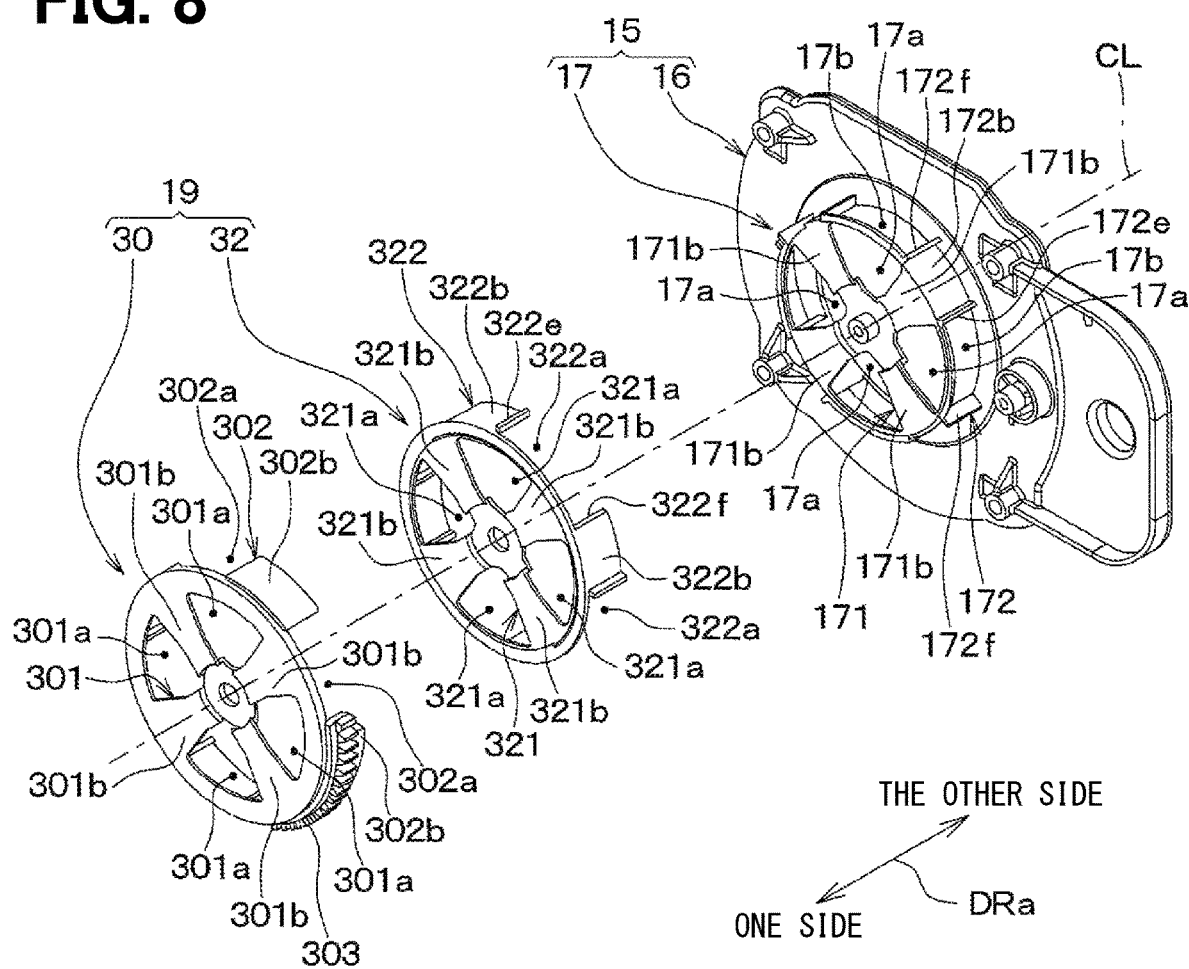
FIG. 8 is a partial exploded perspective view of the exploded perspective view in FIG. 4, which illustrates a door supporter and a door device.

As shown in FIGS. 6 and 8, the inlet portion 17 of the door supporter 15 includes a first inlet portion 171 defining the first inlets 17a and a second inlet portion 172 defining the second inlets 17b. Specifically, the first inlet portion 171 defines four first inlets 17a and the second inlet portion 172 defines four second inlets 17b. The first inlet portion 171 and the second inlet portion 172 are arranged between the passenger supporting portion 802 of the seat 80 and the centrifugal fan 121 of the blower 12 in the axial direction DRa.

The second inlet portion 172 has a tubular shape extending toward the passenger supporting portion 802 of the seat 80 (see FIG. 1). Specifically, the second inlet portion 172 has a substantial cylindrical shape extending from the housing forming portion 16 toward the passenger supporting portion 802 (i.e., toward one side of the second inlet portion 172 facing the passenger supporting portion 802 in the axial direction DRa) along the axial direction DRa. The second inlet portion 172 has a proximal end connected to the housing forming portion 16.

Since the second inlet portion 172 is coaxial with the centrifugal fan 121, the axis CL is also an axis of the second inlet portion 172.

The first inlet portion 171 extends from a position of the second inlet portion 172 near the passenger supporting portion 802 in the radial direction DRr into an inner space of the second inlet portion 172 (i.e., into a radially inner space 172a). Specifically, the first inlet portion 171 is connected to a distal end of the second inlet portion 172 that is opposite to the proximal end of the second inlet portion 172. The first inlet portion 171 is arranged to face the radially inner space 172a from the one side of the second inlet portion 172 in the axial direction DRa.

Further, the first inlet portion 171 includes multiple first inlet walls 171b (concretely four). Each of the first inlet walls 171b has a substantial flat plate shape having a thickness in the axial direction DRa. The multiple first inlet walls 171b and the multiple first inlets 17a are alternately arranged with each other in the circumferential direction DRc. That is, each of the first inlet walls 171b is arranged adjacent to ones of the first inlets 17a in the circumferential direction DRc.

Figure 9:
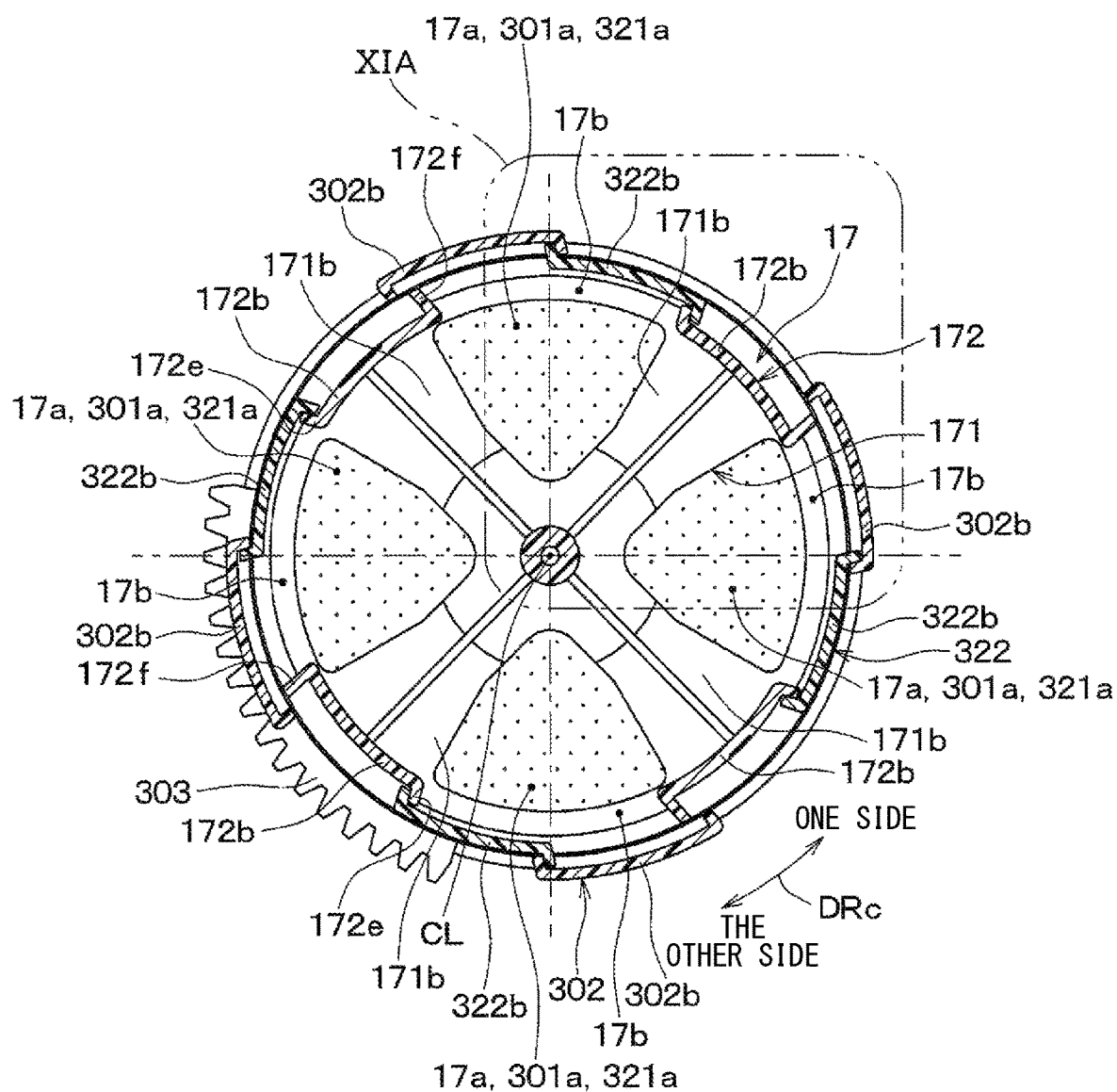
FIG. 9 is a cross-sectional view taken along a line IX-IX in FIG. 6.

Further, as shown in FIGS. 8 and 9, the second inlet portion 172 includes multiple second inlet walls 172b (concretely four). Each of the second inlet walls 172b is a curved wall forming a portion of the cylindrical shape of the second inlet portion 172 about the axis CL. The multiple second inlet walls 172b and the multiple second inlets 17b are alternately arranged with each other in the circumferential direction DRc. That is, each of the second inlet walls 172b is arranged adjacent to each of the second inlets 17b in the circumferential direction DRc.

The first inlets 17a and the second inlets 17b are arranged as shown in FIGS. 1 and 8 such that the first inlets 17a open toward the passenger supporting portion 802 from the inside of the seat 80. As a result, the air drawn into the seat 80 through the passenger supporting portion 802 flows mainly into the first inlets 17a. On the other hand, the second inlets 17b open toward a portion of the seat surface 801 other than the passenger supporting portion 802 (e.g., the side portion 803) from the inside of the seat 80. As a result, the air drawn into the seat 80 through the portion other than the passenger supporting portion 802 flows mainly into the second inlets 17b.

That is, the first inlets 17a are arranged such that a supporting surface passing air that is drawn into the seat 80 through the passenger supporting portion 802 is drawn into the blower 12 through the first inlets 17a. On the other hand, the second inlets 17b is arranged such that air drawn into the seat 80 through a portion of the seat surface 801 other than the passenger supporting portion 802 is more likely to be drawn into the second inlets 17b than into the first inlets 17a.

That the second inlets 17b are arranged such that air drawn into the seat 80 through the portion of the seat surface 801 other than the passenger supporting portion 802 is more likely to be drawn into the second inlets 17b than into the first inlets 17a can be also referred to as that the second inlets 17b are arranged such that the supporting surface passing air is less likely to be drawn into the second inlets 17b than into the first inlets 17a. Furthermore, that the second inlets 17b are arranged such that air drawn into the seat 80 through the portion of the seat surface 801 other than the passenger supporting portion 802 is more likely to be drawn into the second inlets 17b than into the first inlets 17a means the following cases. That is, a first case that the air is drawn into the blower 12 through the first inlets 17a is compared with a second case that the air is drawn into the blower 12 through the second inlets 17b. In that case, the second inlets 17b are arranged such that a ratio of the supporting surface passing air to a total air drawn into the blower 12 in the second case is lower than that in the first case.

As shown in FIGS. 6, 8 and 9, the door device 19 is arranged between the passenger supporting portion 802 (see FIG. 1) of the seat 80 and the blower 12 in the axial direction DRa. The door device 19 is a door configured to open and close the first inlets 17a and the second inlets 17b by rotating about the axis CL. Specifically, the door device 19 is configured to decrease an opening degree of the second inlets 17b as increasing the opening degree of the first inlets 17a. That is, the door device 19 is configured to be moved to open the first inlets 17a while closing the second inlets 17b and to close the first inlets 17a while opening the second inlets 17b.

For example, the door device 19 is configured to fully close the second inlets 17b when fully opening the first inlets 17a. In contrast, the door device 19 is configured to fully open the second inlets 17b when fully closing the first inlets 17a. When the first inlets 17a or the second inlets 17b are fully opened, the opening degree of the first inlets 17a or the second inlets 17b is maximum value within a variable range of the opening degree of the first inlets 17a or the second inlets 17b. When the first inlets 17a or the second inlets 17b are fully closed, the opening degree of the first inlets 17a or the second inlets 17b is zero. In the present embodiment, even if the first inlets 17a are fully closed, there is an air leak through a gap between the door device 19 and the inlet portion 17. However, the door device 19 entirely covers the first inlets 17a. The same applies when the second inlets 17b are fully closed.

The second inlets 17b are arranged between the attachment plate 11 and the housing forming portion 16 in the axial direction DRa. It is preferable that a distance DC between the attachment plate 11 and the housing forming portion 16 in the axial direction DRa be a value between 10 to 30 mm and the distance DC is 20 mm in this embodiment.

In the present embodiment, by setting the distance DC to a value within the above described range, a ventilation area of the second inlets 17b when the second inlets 17b are fully opened is substantially the same as a ventilation area of the first inlets 17a when the first inlets 17a are fully opened.

In FIG. 9, the first inlets 17a are fully opened and the second inlets 17b are fully closed. Further, in FIG. 9, an opening area of the first inlets 17a is hatched with dots. This also applies to dot hatchings in FIGS. 10 to 13 which will be described later.

The door device 19 has a drive door 30 and a driven door 32 in order to open and close the first inlets 17a and the second inlets 17b. Both the drive door 30 and the driven door 32 are rotational doors configured to rotate about the axis CL. However, the driven door 32 is a door that is rotated in association with the drive door 30. That is, the driven door 32 is a door that is rotated about the axis CL by the drive door 30. For example, the door device 19 has an attachment screw 191 fixed to the first inlet portion 171 and the drive door 30 and the driven door 32 are stacked with the inlet portion 17 of the door supporter 15 and rotatably connected to the inlet portion 17 with the attachment screw 191.

The driven door 32 is configured to cover the inlet portion 17 and the drive door 30 is configured to cover the driven door 32. That is, the drive door 30 is configured to cover the inlet portion 17 through the driven door 32 and the drive door 30 has a shape corresponding to the inlet portion 17. The driven door 32 is arranged between the drive door 30 and the inlet portion 17. Further, both the drive door 30 and the driven door 32 are coaxial with the second inlet portion 172.

The drive door 30 has a drive door front portion 301 and a drive door side portion 302. Further, the driven door 32 has a driven door front portion 321 and a driven door side portion 322. The drive door front portion 301 is arranged on one side of the first inlet portion 171 in the axial direction DRa and extends along the first inlet portion 171. The driven door front portion 321 is arranged between the drive door front portion 301 and the first inlet portion 171 and extends along the first inlet portion 171.

Further, the drive door side portion 302 is arranged radially outside of the second inlet portion 172 and extends along the second inlet portion 172. The drive door side portion 302 has a substantial cylindrical shape extending from a radially outer end of the drive door front portion 301 toward the other side of the drive door side portion 302 (i.e., toward the housing forming portion 16) in the axial direction DRa and is arranged coaxial with the second inlet portion 172.

The driven door side portion 322 is arranged between the drive door side portion 302 and the second inlet portion 172 and extends along the second inlet portion 172. The driven door side portion 322 has a substantial cylindrical shape extending from a radially outer end of the driven door front portion 321 toward the other side of the driven door front portion 321 (i.e., toward the housing forming portion 16) in the axial direction DRa and is arranged coaxial with the second inlet portion 172.

The drive door front portion 301 includes drive door front walls 301b and defines drive door front openings 301a. In the present embodiment, each of the number of the drive door front openings 301a and the number of the drive door front walls 301b is four. The drive door front openings 301a and the drive door front walls 301b are alternately arranged each other in the circumferential direction DRc. That is, each of the drive door front openings 301a is arranged adjacent to ones of the drive door front walls 301b in the circumferential direction DRc.

Specifically, each of the drive door front walls 301b has a substantial flat plate shape having a thickness in the axial direction DRa. Further, each of the drive door front openings 301a is a through hole passing through the drive door front portion 301 in the axial direction DRa.

The drive door side portion 302 includes drive door side walls 302b and defines drive door side openings 302a. In the present embodiment, each of the number of the drive door side openings 302a and the number of the drive door side walls 302b is four. The drive door side openings 302a and the drive door side walls 302b are alternately arranged with each other in the circumferential direction DRc. That is, each of the drive door side openings 302a is arranged adjacent to ones of the drive door side walls 302b in the circumferential direction DRc.

Specifically, each of the drive door side walls 302b has a curved wall shape forming a part of the cylindrical shape of the drive door side portion 302 about the axis CL. Further, each the drive door side openings 302a has a cut out shape opening toward the other side of the drive door side portion 302 (i.e., toward the housing forming portion 16) in the axial direction DRa.

The driven door front portion 321 includes driven door front walls 321b and defines driven door front openings 321a. In the present embodiment, each of the number of the driven door front openings 321a and the number of the driven door front walls 321b is four. The driven door front openings 321a and the driven door front walls 321b are alternately arranged each other in the circumferential direction DRc. That is, each of the driven door front openings 321a is arranged adjacent to ones of the driven door front walls 321b in the circumferential direction DRc.

Specifically, each of the driven door front walls 321b has a substantial flat plate shape having a thickness in the axial direction DRa. Further, each of the driven door front openings 321a is a through hole passing through the driven door front portion 321 in the axial direction DRa. In FIG. 9, the drive door front walls 301b and the driven door front walls 321b are hidden behind the first inlet walls 171b, so that they are not illustrated in FIG. 9.

The driven door side portion 322 includes driven door side walls 322b and defines driven door side openings 322a. In the present embodiment, each of the number of the driven door side openings 322a and the number of the driven door side walls 322b is four. The driven door side openings 322a and the driven door side walls 322b are alternately arranged in the circumferential direction DRc. That is, each of the driven door side openings 322a is arranged adjacent to ones of the driven door side walls 322b in the circumferential direction DRc.

Specifically, each of the driven door side walls 322b has a curved wall shape forming a part of the cylindrical shape of the driven door side portion 322 about the axis CL. Further, each of the driven door side openings 322a has cut out shape opening toward the other side of the driven door side openings 322a (i.e., toward the housing forming portion 16) in the axial direction DRa.

The drive door 30 is a door configured to rotate the driven door 32 and to be rotated by the door operating device 22. Specifically, the door operating device 22 has a structure similar to that of a wire heater controller that is manually rotated for a manual vehicle air-conditioner.

Figure 10:
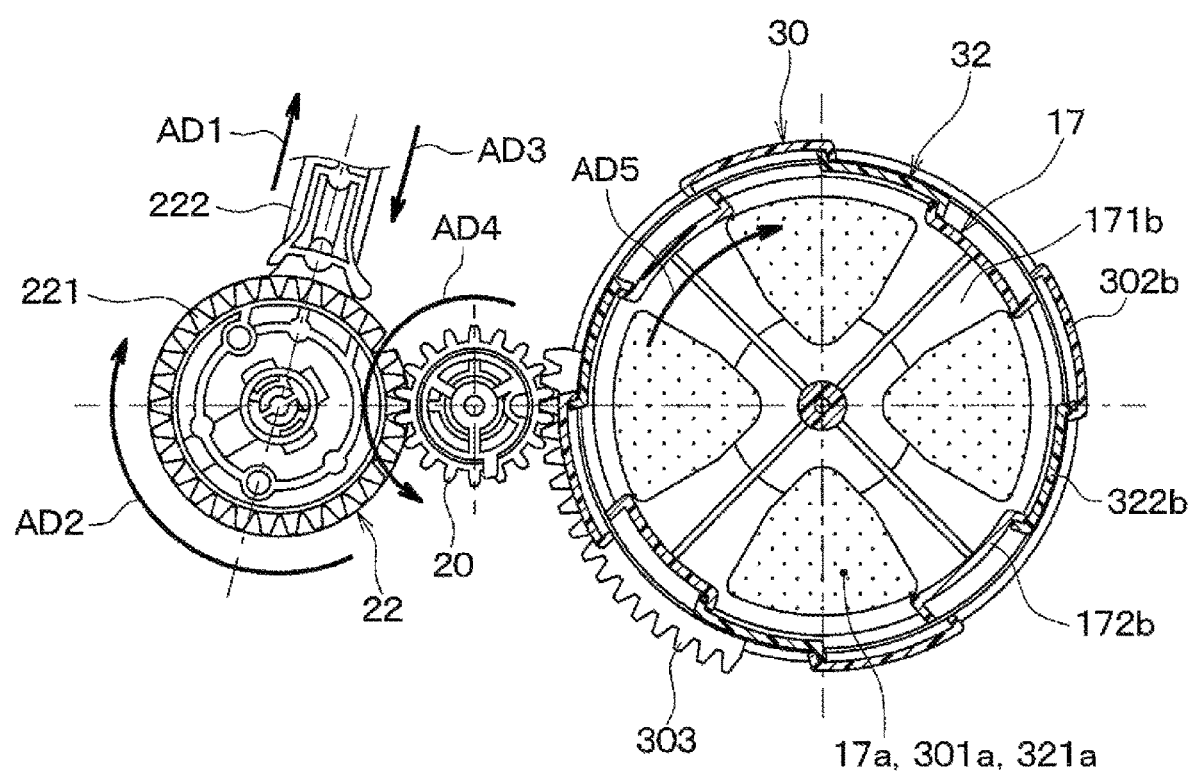
FIG. 10 is a diagram illustrating a connection relationship between a door operating device and a drive door in the first embodiment, in which illustrations of an intermediate gear, a door connecting gear of the door operating device, and a wire supporter are added to the cross-sectional view in FIG. 9.

For example, as shown in FIGS. 4 and 10, the door operating device 22 has a door connecting gear 221 and a wire supporter 222. The wire supporter 222 is configured to rotatably support the door connecting gear 221 and also support two operating wires 223 around the door connecting gear 221 for rotating the door connecting gear 221. Since the wire supporter 222 is connected to the housing forming portion 16 of the door supporter 15, the door connecting gear 221 is rotatably connected to the housing forming portion 16.

Further, the drive door 30 has a drive gear 303 connected to the drive door side portion 302. The drive gear 303 is disposed in a particular range in a circumference of the drive door 30 in the circumferential direction DRc. The door connecting gear 221 meshes with the drive gear 303 via the intermediate gear 20 that is rotatably connected to the housing forming portion 16 of the door supporter 15. For example, the intermediate gear 20 is rotatably connected to the housing forming portion 16 by an attachment screw 201.

Since the intermediate gear 20 is disposed between the drive gear 303 and the door connecting gear 221, the door connecting gear 221 and the wire supporter 222 can be easily disposed not to interfere with airflows flowing into the second inlets 17b.

The two operating wires 223 are connected to the door connecting gear 221. The door connecting gear 221 is rotated in a first direction when one of the two operating wires 223 is pulled and rotated in a second direction that is opposite to the first direction when the other one of the two operating wires 223 is pulled. For example, a manual operation unit for pulling the two operating wires 223 is mounted on a place such as the side portion 803 so that the passenger can easily operate the unit.

For example, when one of the two operating wires 223 is pulled as shown by an arrow AD1, the door connecting gear 221 is rotated as shown by an arrow AD2. At the same time, the other operating wire 223 is wound around the door connecting gear 221 and pulled toward the door connecting gear 221 as shown by an arrow AD3. Then, in association with the rotation of the door connecting gear 221 shown in the arrow AD2, the intermediate gear 20 is rotated as shown in an arrow AD4 and the drive door 30 is rotated as shown in an arrow AD5. In the present embodiment, a range of an operating angle of the drive door is 60 degrees. In other words, the drive door 30 is configured to rotate within a range of 60 degrees.

FIG. 11A to 11D are views of positions of the drive door 30 and the driven door 32 at different operating angles of the drive door 30. As shown in FIGS. 11A to 11D, each of the drive door side walls 302b has one end portion 302c and the other end portion 302d in the circumferential direction DRc. Each of the drive door side walls 302b includes a first drive protrusion 302e protruding inward from the one end portion 302c in the radial direction DRr and a second drive protrusion 302f protruding inward from the other end portion 302d in the radial direction DRr. Each of the four drive door side walls 302b has the first drive protrusion 302e and the second drive protrusion 302f.

Each of the driven door side walls 322b has one end portion 322c and the other end portion 322d in the circumferential direction DRc. Each of the driven door side walls 322b includes a first driven protrusion 322e protruding outward from the one end portion 322c in the radial direction DRr and a second driven protrusion 322f protruding inward from the other end portion 322d in the radial direction DRr. Each of the four driven door side walls 322b has the first driven protrusion 322e and the second driven protrusion 322f.

Further, each of the second inlet walls 172b includes one end portion 172c and the other end portion 172d in the circumferential direction DRc. Each of the second inlet walls 172b includes a first stopper 172e protruding outward from the one end portion 172c in the radial direction DRr. Further, each of the second inlet walls 172b includes a second stopper 172f protruding outward from the other end portion 172d in the radial direction DRr. Each of the four second inlet walls 172b includes the first stopper 172e and the second stopper 172f.

Figure 11A:
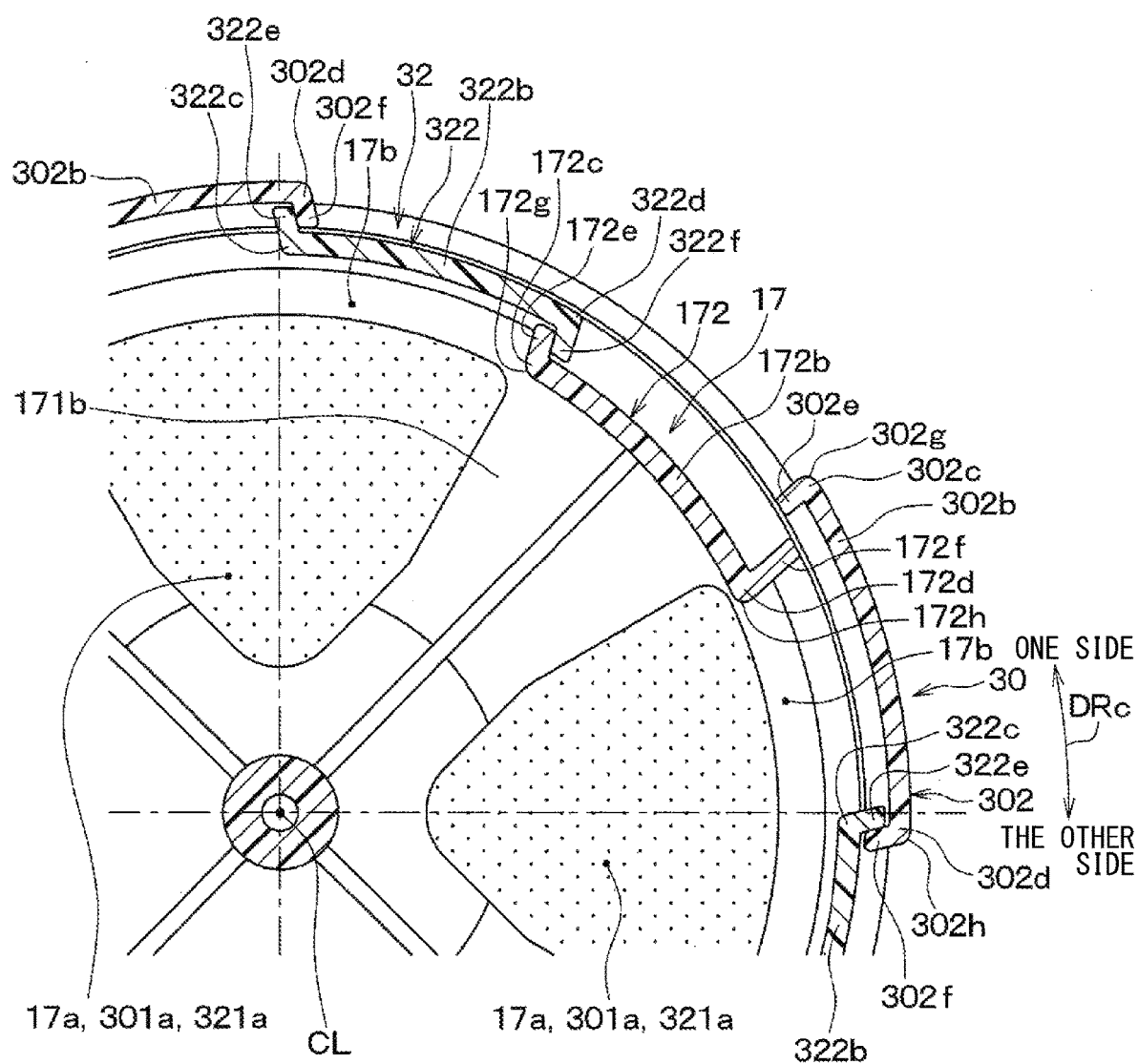
FIG. 11A is an enlarged cross-sectional view of a XIA portion of FIG. 9, which illustrates a first door state of the drive door and a driven door.

As shown in FIG. 11A, the one end portion 302c of each of the drive door side walls 302b includes a radially outer portion 302g having a curved shape. Similarly, the other end portion 302d of each of the drive door side walls 302b includes a radially outer portion 302h having a curved shape. The radially outer portion 302g is an outer portion of the one end portion 302c in the radial direction DRc facing away from the axis CL. The radially outer portion 302h is an outer portion of the other end portion 302d in the radial direction facing away from the axis.

Further, the one end portion 172c of each of the second inlet walls 172b includes a radially inner portion 172g having a curved shape. Similarly, the other end portion 172d of each of the second inlet walls 172b includes a radially inner portion 172h having a curved shape. The radially inner portion 172g is an inner portion of the one end portion 172c in the radial direction DRr facing the axis CL. The radially inner portion 172h is an inner portion of the other end portion 172d in the radial direction DRr facing the axis CL.

Figure 11B:
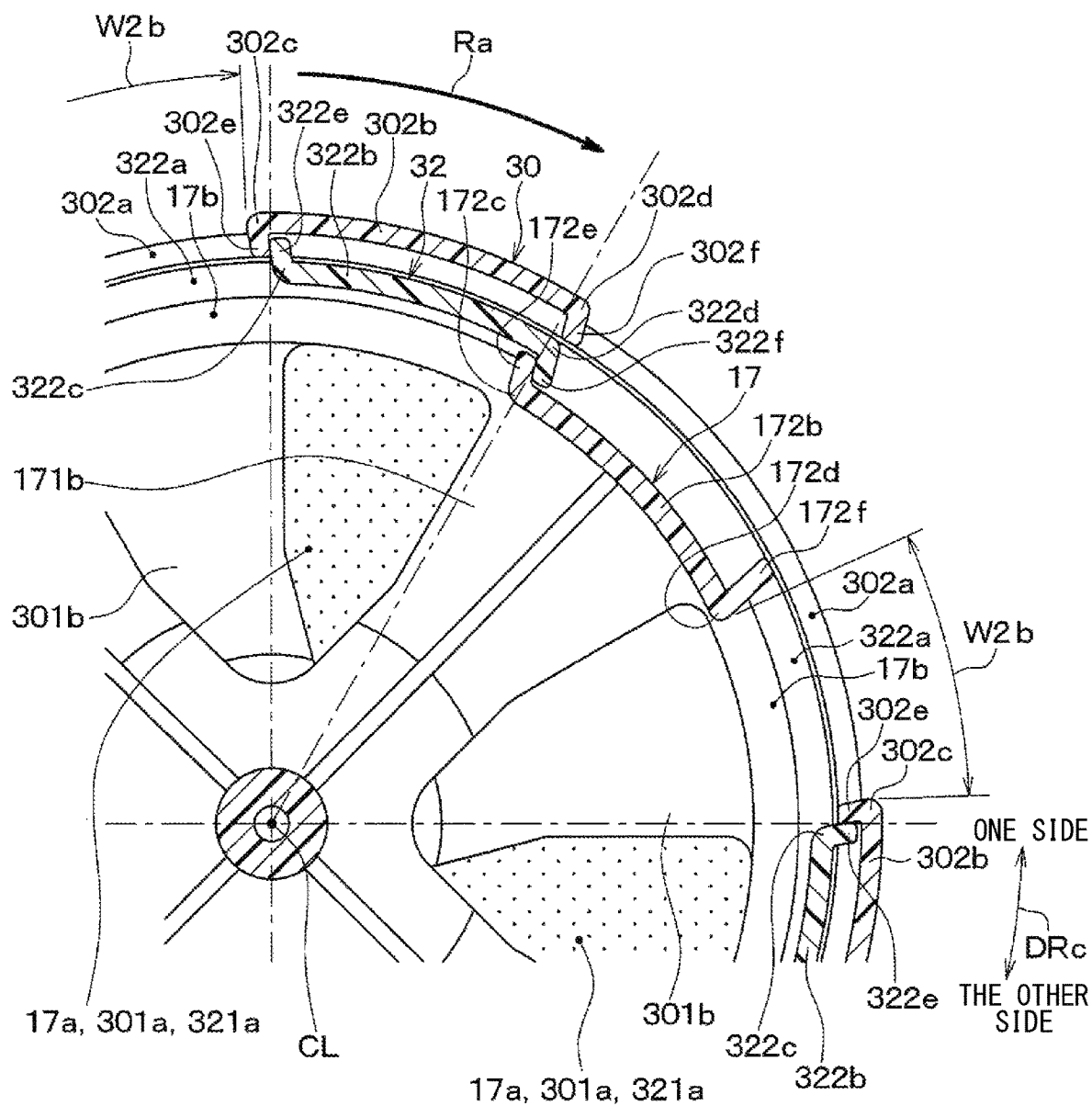
FIG. 11B is an enlarged cross-sectional view of the XIA portion of FIG. 9, which illustrates a second door state where the drive door is moved in a second direction of a circumferential direction of a fan by 30 degrees from the first door state in FIG. 11A.
Figure 11C:
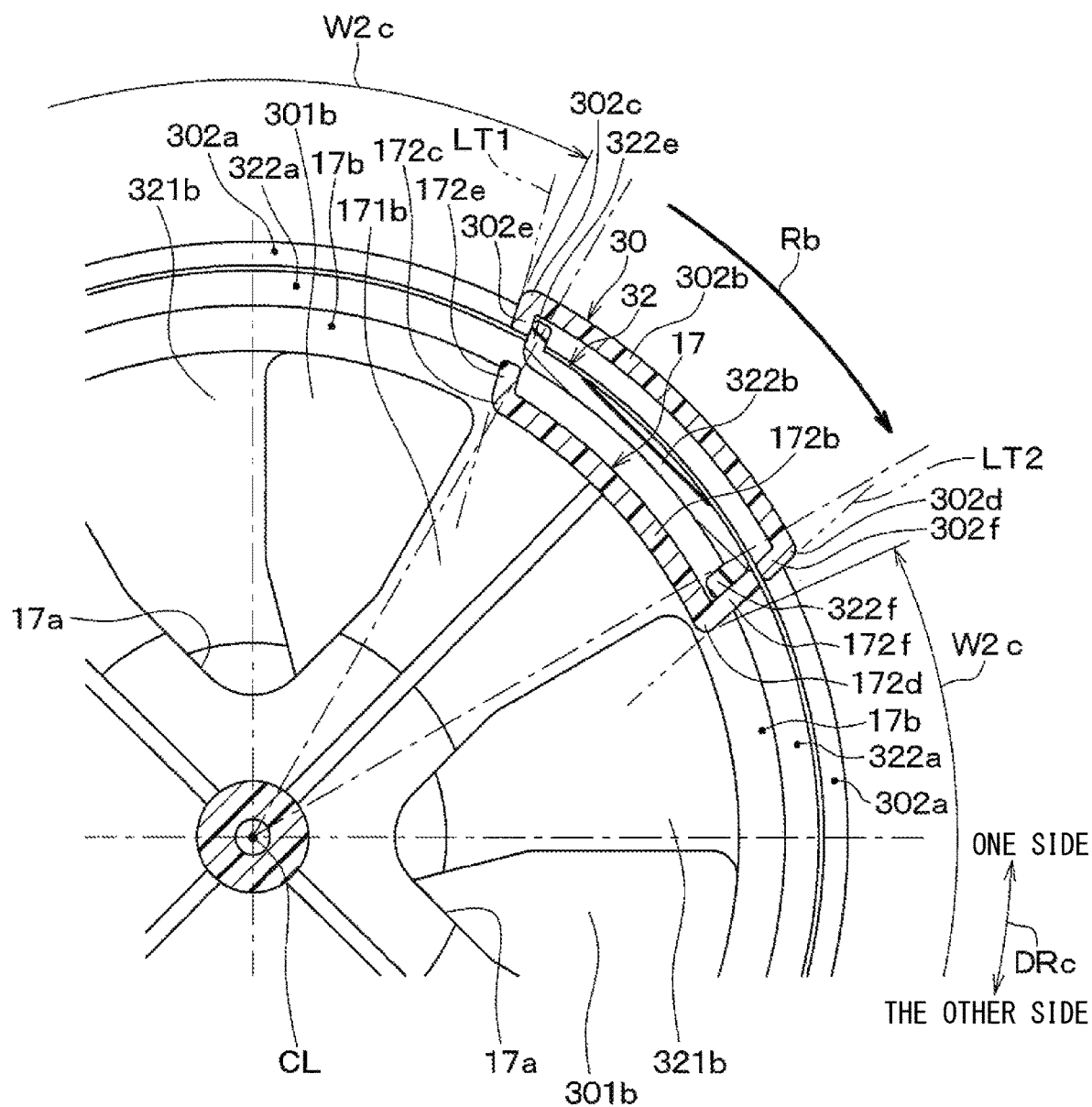
FIG. 11C is an enlarged cross-sectional view of the XIA portion of FIG. 9, which illustrates a third door state where the drive door is moved in the second direction of the circumferential direction of the fan by 30 degrees from the second door state in FIG. 11B.

In FIGS. 11A to 11D, when the first inlets 17a are closed, the drive door 30 and the driven door 32 is rotated to change their positions in the order of FIGS. 11A, 11B, and 11C. On the contrary, when the first inlets 17a are open, the drive door 30 and the driven door 32 is rotated to change their positions in the order of FIGS. 11C, 11D, and 11A.

FIG. 11A is an enlarged view of a XIA portion of FIG. 9, which illustrates a state where the first inlets 17a are fully opened and the second inlets 17b are fully closed.

As shown by dot hatching in FIG. 11A, the first inlets 17a, the drive door front openings 301a, and the driven door front openings 321a are aligned with each other in the axial direction DRa to define through holes in the axial direction DRa. As a result, the first inlets 17a are fully opened. That is, the door device 19 is configured to open the first inlets 17a by having the drive door front openings 301a and the driven door front openings 321a aligned with the first inlets 17a in the axial direction DRa to define through holes by the first inlets 17a, the drive door front openings 301a, and the driven door front openings 321a.

On the other hand, focusing on the second inlets 17b in FIG. 11A, the drive door side walls 302b are offset from the driven door side walls 322b in the circumferential direction DRc so that the drive door side walls 302b align with the second inlets 17b in the radial direction DRr and the driven door side walls 322b align with the second inlets 17b in the radial direction DRr. Thereby, the second inlets 17b are fully closed. That is, the door device 19 is configured to close the second inlets 17b by moving the drive door side walls 302b and the driven door side walls 322b to be offset from each other in the circumferential direction DRc so that the drive door side walls 302b align with the second inlets 17b in the radial direction DRr and the driven door side walls 322*b* are align with the second inlets 17*b* in the radial direction DRr.

At this time, the drive door side walls 302*b* and the driven door side walls 322*b* are offset from the second inlet walls 172*b* in the circumferential direction DRc. Specifically, when the second inlets 17*b* are fully closed, each of the driven door side walls 322*b* is located on a first side of the second inlet wall 172*b* in the circumferential direction DRc while a part of the each of the driven door side walls 322*b* overlaps with the second inlet wall 172*b*. At the same time, each of the drive door side walls 302*b* is located on a first side of the driven door side wall 322*b* in the circumferential direction DRc while a part of the each of the drive door side walls 302*b* overlaps with the driven door side wall 322*b*.

When the drive door 30 rotates in a second direction (i.e., in the other side direction) of the circumferential direction DRc by 30 degrees from the state shown in FIG. 11 A as shown in an arrow Ra (see FIG. 11B), the drive door 30 and the driven door 32 are in a state shown in FIG. 11B. Through a transition from the state shown in FIG. 11A to the state shown in FIG. 11B, the drive door 30 rotates but the driven has not been rotated yet. Thus, the position of the driven door 32 in FIG. 11B is the same as that in FIG. 11A.

As shown in the dot hatching in FIG. 11B, the state shown in FIG. 11B is a middle state between a fully open state and a fully closed state where the first inlets 17*a* are half opened. The second inlets 17*b* are also half opened. Each of arrows W2*b* in FIG. 11B indicates an opening range of the second inlet 17*b* in the circumferential direction DRc.

Subsequently, when the drive door 30 further rotates in the second direction of the circumferential direction DRc from the state shown in FIG. 11B by 30 degrees as shown in an arrow Rb (see FIG. 11C), the drive door 30 and the driven door 32 are in a state shown in FIG. 11C. Through a transition from the state in FIG. 11B to the state in FIG. 11C, the driven door 32 is rotated in the second direction of the circumferential direction DRc in association with a rotation of the drive door 30. In short, both the drive door 30 and the driven door 32 rotate in the second direction of the circumferential direction DRc by 30 degrees.

Specifically, when the drive door 30 rotates in the second direction of the circumferential direction DRc from the state shown in FIG. 11B to the state shown in FIG. 11C, the drive door 30 rotates the driven door 32 in the second direction of the circumferential direction DRc by the first drive protrusions 302*e* pushing portions of the driven door 32. The portions of the driven door 32 pushed by the first drive protrusions 302*e* are the first driven protrusions 322*e*. That is, the driven door 32 is rotated in the second direction of the circumferential direction DRc by the first drive protrusions 302*e* pushing the first driven protrusions 322*e*.

In the state shown in FIG. 11C, the first inlets 17*a* are fully closed and the second inlets 17*b* are fully opened. Each of arrows W2*c* in FIG. 11C indicates an opening range of the second inlet 17*b* in the circumferential direction DRc.

As shown in FIG. 11C, the drive door front walls 301*b* and the driven door front walls 321*b* are offset from each other in the circumferential direction DRc, the drive door front walls 301*b* align with the first inlets 17*a*, and the driven door front walls 321*b* align with the first inlets 17*a*, thereby fully closing the first inlets 17*a*. That is, the door device 19 is configured to close the first inlets 17*a* by moving the drive door front walls 301*b* and the driven door front walls 321*b* to be offset from each other in the circumferential direction DRc so that the drive door front walls 301*b* are aligned with the first inlets 17*a* in the axial direction DRr and the driven door front walls 321*b* are aligned with the first inlets 17*a* in the axial direction DRr.

At this time, the drive door front walls 301*b* and the driven door front walls 321*b* are offset from the first inlet walls 171*b* in the circumferential direction DRc. Specifically, when the first inlets 17*a* are fully closed, each of the driven door front walls 321*b* is located on a second side of the first inlet wall 171*b* in the circumferential direction DRc while a portion of the each of the driven door front walls 321*b* overlaps with the first inlet wall 171*b*. At the same time, each of the drive door front walls 301*b* is located on a second side of the driven door front wall 321*b* in the circumferential direction DRc while a portion of the each of the drive door front walls 301*b* overlaps with the driven door front wall 321*b*.

On the other hand, focusing on the second inlets 17*b* in FIG. 11C, the second inlets 17*b*, the drive door side openings 302*a*, and the driven door side openings 322*a* are aligned with each other in the radial direction DRr to define through holes in the radial direction DRr. Thus, the second inlets 17*b* are fully opened. That is, the door device 19 is configured to open the second inlets 17*b* by having the second inlets 17*b*, the drive door side openings 302*a*, and the driven door side openings 322*a* aligned with each other in the radial direction DRr to define through holes by the second inlets 17*b*, the drive door side openings 302*a*, and the driven door side openings 322*a*.

Further, when the second inlets 17*b* are fully opened, the drive door side walls 302*b* overlaps with an entire of the driven door side walls 322*b* from an outer side of the driven door side walls 322*b* in the radial direction DRr. At the same time, the second inlet walls 172*b* overlaps with an entire of the driven door side walls 322*b* from an inner side of the driven door side walls 322*b* in the radial direction DRr.

In other words, in the cross section shown in FIG. 11C, when the door device 19 maximizes an opening degree of the second inlets 17*b*, i.e., when the door device 19 is in a fully open position where the second inlets 17*b* are fully open, the driven door side walls 322*b* are as follows. That is, in that case, each of the driven door side walls 322*b* is accommodated within an area surrounded by a first virtual line LT1, a second virtual line LT2, the second inlet wall 172*b*, and the drive door side wall 302*b*.

Here, the cross-section shown in FIG. 11C is a cross-section perpendicular to the axis CL. The first virtual line LT1 is defined as a line passing through both the one end portion 172*c* of the second inlet wall 172*b* that is aligned with the driven door side wall 322*b* and the one end portion 302*c* of the drive door side wall 302*b* that is aligned with the driven door side wall 322*b*. Specifically, the first virtual line Lt1 is in contact with the one end portion 172*c* and the one end portion 302*c* from a side of the one end portions 172*c* and 302*c* away from the other end portions 172*d* and 302*d* in the circumferential direction DRc. The second virtual line LT2 is defined as a line passing through both the other end portion 172*d* of the second inlet walls 172*b* that is aligned with the driven door side wall 322*b* and the other end portion 302*d* of the drive door side wall 302*b* that is aligned with the driven door side wall 322*b*. Specifically, the second virtual line LT2 is in contact with the other end portion 172*d* and the other end portion 302*d* from a side of the other end portions 172*d* and 302*d* away from the one end portions 172*c* and 302*c* in the circumferential direction DRc.

Further, as shown in FIG. 11C, the second stoppers 172*f* of the second inlet portion 172 are configured to stop a rotation of the driven door 32 that is being rotated in the second direction of the circumferential direction DRc by interfering with portions of the driven door 32. The portions of the driven door 32 coming into contact with the second stoppers 172f are the second driven protrusions 322f.

That is, the driven door 32 is stopped to be rotated in the second direction of the circumferential direction DRc by the second stoppers 172f interfering with the second driven protrusions 322f. At this time, since the first drive protrusions 302e of the drive door 30 are in contact with the first driven protrusions 322e of the driven door 32 from a first side of the first driven protrusions 322e away from the second driven protrusion 322f in the circumferential direction DRc, the rotation of the drive door 30 in the second direction of the circumferential direction DRc is also stopped by the second stoppers 172f.

Subsequently, when the drive door 30 rotates in a first direction of the circumferential direction DRc that is opposite to the second direction by 30 degrees as shown in an arrow Rc (see FIG. 11D), the drive door 30 and the driven door 32 are in a state shown in FIG. 11D. Through a transition from the state shown in FIG. 11C to the state shown in FIG. 11D, the drive door 30 rotates but the driven door 32 has not been rotated yet. Thus, the position of the driven door 32 in FIG. 11D is the same as that in FIG. 11C.

Figure 11D:
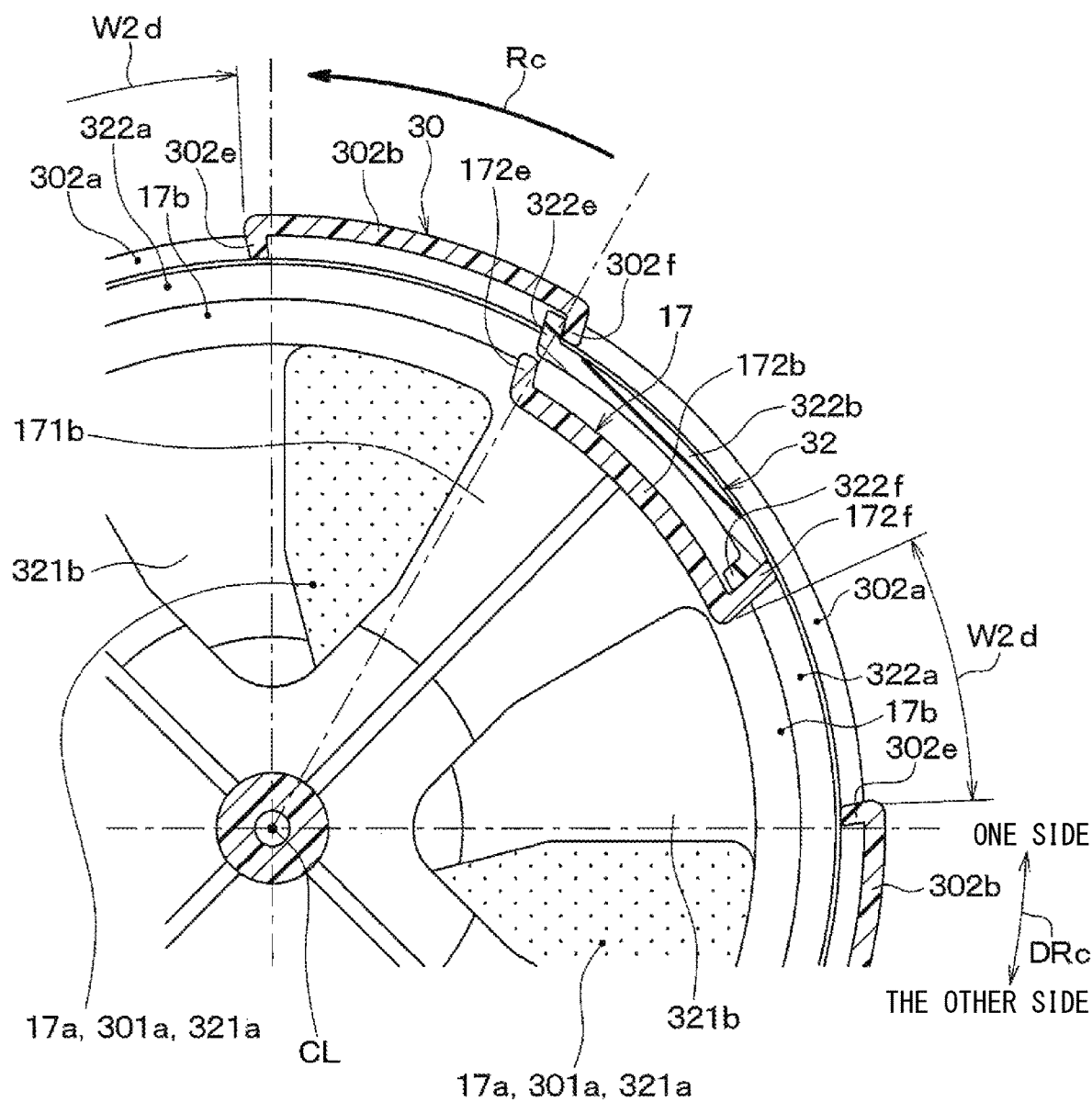
FIG. 11D is an enlarged cross-sectional view of the XIA portion of FIG. 9, which illustrates a fourth door state where the drive door is moved in the second direction of the circumferential direction of the fan by 30 degrees from the third door state in FIG. 11C.

As shown in dot hatching in FIG. 11D, the first inlets 17a are half opened and the second inlets 17b are half opened. Each of arrows W2d in FIG. 11D indicates an opening range of the second inlet 17b in the circumferential direction DRc.

Subsequently, when the drive door 30 further rotates in the first direction of the circumferential direction DRc by 30 degrees from the state shown in FIG. 11D, the drive door 30 and the driven door 32 are in the state shown in FIG. 11A. Through a transition from the state shown in FIG. 11D to the state shown in FIG. 11A, the driven door 32 is rotated in the first direction of the circumferential direction DRc by the drive door 30. In short, both the drive door 30 and the driven door 32 rotate in the first direction of the circumferential direction DRc by 30 degrees.

Specifically, when the drive door 30 rotates in the first direction of the circumferential direction DRc from the state shown in FIG. 11D to the state shown in FIG. 11A, the drive door 30 rotates the driven door 32 in the first direction of the circumferential direction DRc by the second drive protrusions 302f pushing portions of the driven door 32. The portions of the driven door 32 pushed by the second drive protrusions 302f are the first driven protrusions 322e. That is, in this case, the driven door 32 is rotated in the first direction of the circumferential direction DRc by the second drive protrusions 302f of the drive door 30 pushing the first driven protrusions 322e of the driven door 32.

Further, as shown in FIG. 11A, the first stoppers 172e of the second inlet portion 172 are configured to stop the driven door 32 being rotated in the first direction of the circumferential direction DRc by interfering with portions of the driven door 32. The portions of the driven door 32 coming into contact with the first stoppers 172e are the second driven protrusions 322f.

That is, in this case, the driven door 32 is stopped to be rotated in the first direction of the circumferential direction DRc by the first stoppers 172e interfering with the second driven protrusions 322f. At this time, since the second drive protrusions 302f of the drive door 30 are in contact with the first driven protrusions 322e of the driven door 32 from a second side of the first driven protrusions 322e in the circumferential direction DRc, a rotation of the drive door 30 in the first direction of the circumferential direction DRc is also stopped by the first stoppers 172e.

As described above, the drive door 30 is configured to increase an opening degree of the first inlets 17a while decreasing an opening degree of the second inlets 17b as the drive door 30 moves in the first direction of the circumferential direction DRc. On the contrary, the drive door 30 is configured to decrease the opening degree of the first inlets 17a while increasing the opening degree of the second inlets 17b as the drive door 30 rotates in the second direction of the circumferential direction DRc. The drive door 30 is configured to rotate within a range of 60 degrees about the axis CL and the driven door 32 is configured to be rotated within a range of 30 degrees about the axis CL.

Figure 12:
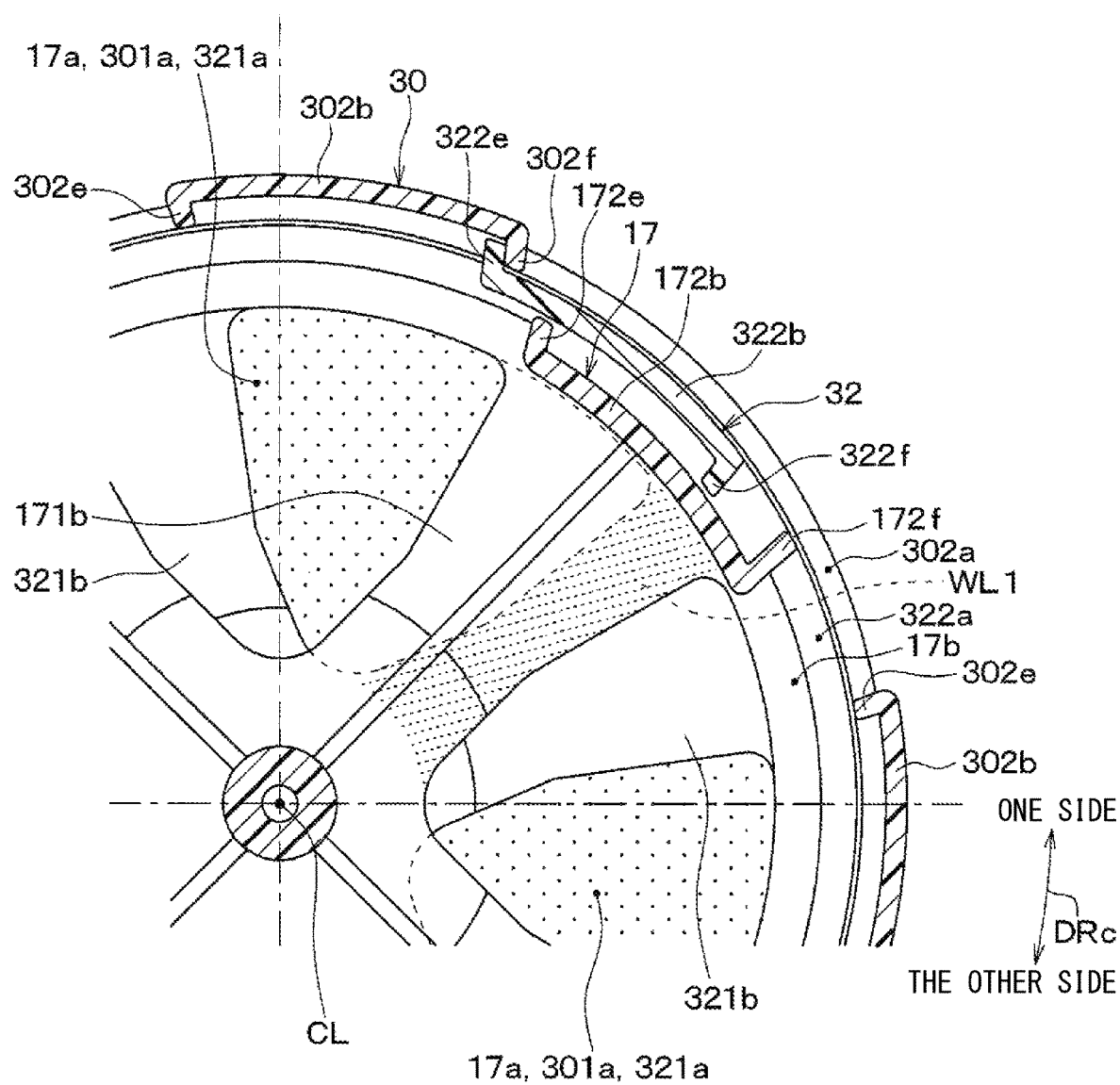
FIG. 12 is an enlarged cross-sectional view of the XIA portion of FIG. 9, which illustrates a state where the drive door moves in a first direction of the circumferential direction of the fan to be the first state shown in FIG. 11A from the fourth state shown in FIG. 11D.

FIG. 12 is a view illustrating a transition state where the drive door 30 rotates in the first direction of the circumferential direction DRc from the state in FIG. 11D to the state in FIG. 11A. As shown in FIGS. 12 and 8, the door device 19 increases an overlapping area WL1 (see FIG. 12) between the drive door front walls 301b and the first inlet walls 171b as increasing the opening degree of the first inlets 17a. In FIG. 12, the drive door front walls 301b are hidden behind the driven door front walls 321b on a plane of a paper surface of FIG. 12.

Figure 13:
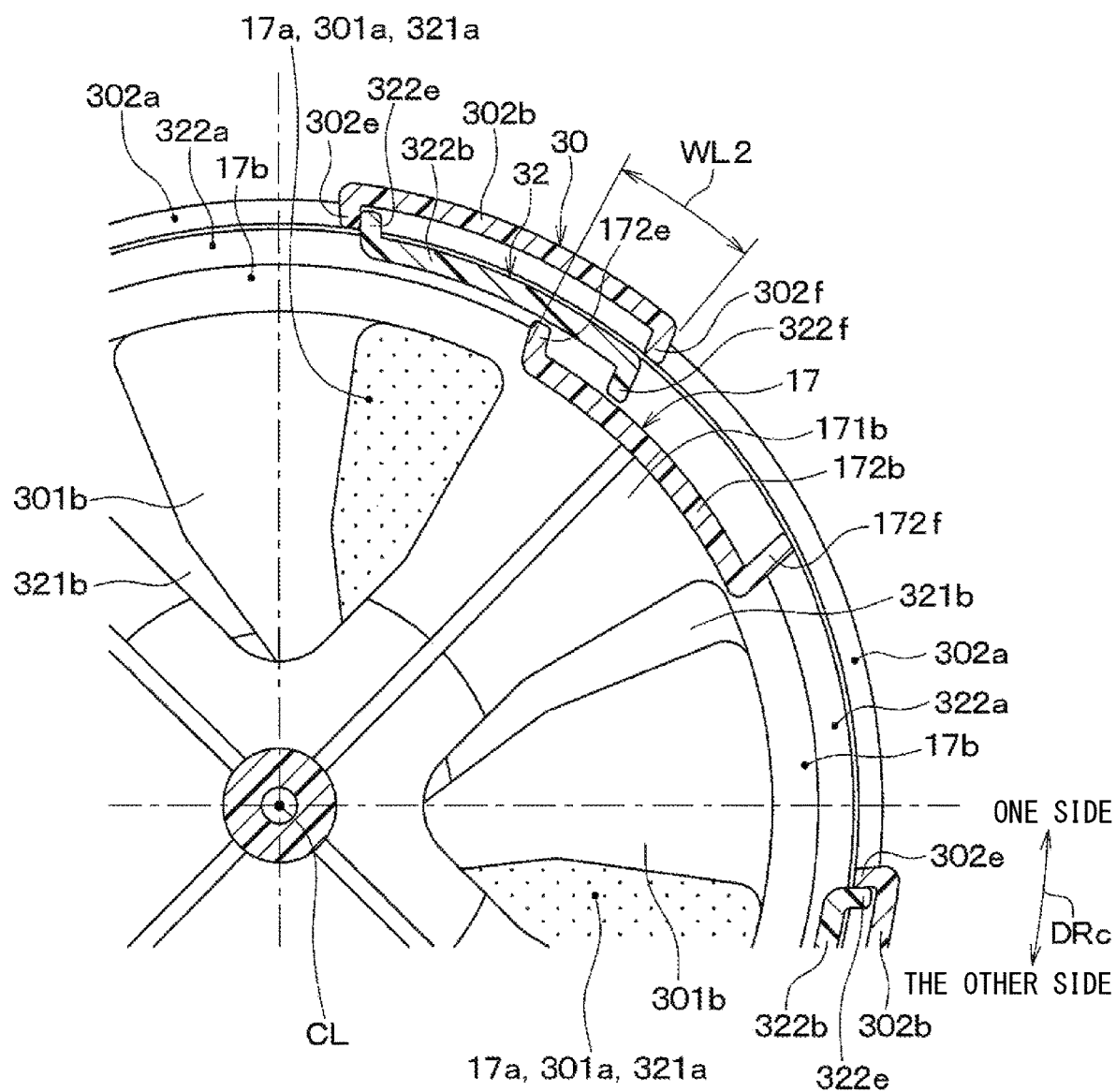
FIG. 13 is an enlarged cross-sectional view of the XIA portion of FIG. 9, which illustrates a state where the drive door is moved in the second direction of the circumferential direction of the fan to be the third state shown in FIG. 11C from the second state shown in FIG. 11B.

Further, FIG. 13 is a view illustrating a transition state where the drive door 30 rotates in the second direction of the circumferential direction DRc from FIG. 11B to FIG. 11C. As shown in FIG. 13, the door device 19 increases an overlapping area WL2 between the drive door side walls 302b and the second inlet walls 172b as increasing the opening degree of the second inlets 17b.

Further, as shown in FIGS. 6 and 9, when the door device 19 maximizes the opening degree of the first inlets 17a, in other words, when the door device 19 is in a second fully open position where the first inlets 17a are fully open, the second inlets 17b are fully closed. Therefore, the second inlet walls 172b, the drive door side walls 302b, and the driven door side walls 322b form a cylindrical wall extending along the axial direction DRa about the axis CL. That is, in that case, the radially inner space 172a defined inside of the cylindrical wall serves as a ventilation passage extending straight along the axis CL shown in an arrow La in FIG. 6.

As described above, according to the present embodiment, as shown in FIGS. 2 and 8, in the seat air-conditioner 10, the door device 19 is configured to move to open the first inlets 17a while closing the second inlets 17b. On the contrary, the door device 19 is configured to move to close the first inlets 17a while closing the second inlets 17b. The first inlets 17a are arranged such that an air drawn into the seat 80 through the passenger supporting portion 802 is drawn into the blower 12 through the first inlets 17a. The second inlets 17b are arranged such that an air drawn into the seat 80 through a portion (i.e., the side portion 803) of the seat surface 801 other than the passenger supporting portion 802 is more likely to be drawn into the second inlets 17b than into the first inlets 17a.

Therefore, the blower 12 can draw air not only when the first inlets 17a are opened, but also when the first inlets 17a are closed, and the blower 12 can maintain an amount of air blown out in the rearward direction of the seat 80. When the door device 19 is moved to open the first inlets 17a, the amount of air drawn into the blower 12 through the passenger supporting portion 802 of the seat 80 increases. On the contrary, when the door device 19 is moved to close the first inlets 17a, the amount of air drawn into the blower 12 through the passenger supporting portion 802 decreases. That is, it is possible to adjust the amount of air drawn into the blower 12 through the passenger supporting portion 802 of the seat 80 by operating the door device 19 while maintaining the amount of air blown out in the rearward direction of the seat 80.

For example, in the present embodiment, as shown in FIG. 11C, if the first inlets 17a are fully closed by operating the door device 19, an airflow into the seat 80 through the passenger supporting portion 802 is stopped while the amount of air blown out in the rearward direction of the seat 80 is maintained. Further, since the door device 19 can be moved between the state shown in FIG. 11A and the FIG. 11C, the amount of air drawn into the seat 80 through the passenger supporting portion 802 can be adjusted while maintaining an amount of air blown out in the rearward direction of the seat 80.

In this way, the amount of air for seat air-conditioning can be adjusted while keeping a constant input of the motor 122 of the blower 12 and restricting the amount of air blown out in the rearward direction of the seat 80 from fluctuating. Furthermore, it is also possible to stop the seat air-conditioning by closing the first inlets 17a while continuing to blow air in the rearward direction of the seat 80. The seat air-conditioning is an operation to draw an air into the seat 80 through the passenger supporting portion 802.

For example, a case in summer than a mother is seated on the seat 80 that is a front seat in a hot vehicle cabin and a child is seated on a rear seat is supposed. Shortly after the mother and the child get on the vehicle, the heat in the front seat eases faster than in the rear seat by an air-conditioning of the vehicle. In that case, even if the seat air-conditioning by the seat air-conditioner 10 is stopped by an operation of the passenger, a comfortable air can be sent toward the child seated on the rear seat.

Further, as described above, since the amount of air for the seat air-conditioning can be adjusted while keeping a constant input to the motor 122 of the blower 12, a control of a rotational speed of the motor 122 of the blower 12 is not needed for adjusting the amount of air for the seat air-conditioning. Thus, it is not necessary to apply an expensive brushless motor as the motor 122. That is, a controller for the motor 122 and a heating resister used for controlling the rotational speed of the brushless motor are not needed. Therefore, the electrical configuration for operating the motor 122 of the blower 12 of the present embodiment can be inexpensive and simplified.

Further, according to the present embodiment, as shown in FIGS. 2 and 8, the door device 19 decreases the opening degree of the second inlets 17b as increasing the opening degree of the first inlets 17a. Therefore, it is possible to increase or decrease the amount of air drawn into the seat 80 through the passenger supporting portion 802 by the operation of the door device 19 while keeping the predetermined amount of air blown out by the blower 12.

Further, according to the present embodiment, as shown in FIGS. 8 and 9, the drive door 30 and the driven door 32 are coaxial with each other. The door device 19 is divided into four regions in the circumferential direction DRc each defining the first inlet 17a and the second inlet 17b. The drive door 30 and the driven door 32 open and close the first inlets 17a and the second inlets 17b in the four regions. As a result, it is possible to open and close the first inlets 17a and the second inlets 17b by moving the drive door 30 and the driven door 32 within a small range such as 60 degrees for the drive door 30 and 30 degrees for the driven door 32.

Further, according to the present embodiment, as shown in FIGS. 6 and 8, the inlet portion 17 includes the first inlet portion 171 defining the first inlets 17a and the second inlet portion 172 defining the second inlets 17b. The second inlet portion 172 has a tubular shape extending toward the passenger supporting portion 802. The first inlet portion 171 extends from a position of the second inlet portion 172 near the passenger supporting portion 802 into the radially inner space 172a of the second inlet portion 172. Then, the door device 19 opens and closes the first inlets 17a and the second inlets 17b by rotating about the axis CL.

Therefore, it is easy to open the first inlets 17a toward the passenger supporting portion 802 from the inside of the seat 80 and open the second inlets 17b toward a portion of the seat 80 other than the passenger supporting portion 802. As a result, the second inlets 17b can be arranged such that an air drawn into the seat 80 through the portion of the seat surface 801 other than the passenger supporting portion 802 is more likely to be drawn into the second inlets 17b than into the first inlets 17a.

The first inlets 17a, the second inlets 17b, and the door device 19 can be arranged in a small space.

Figure 14:
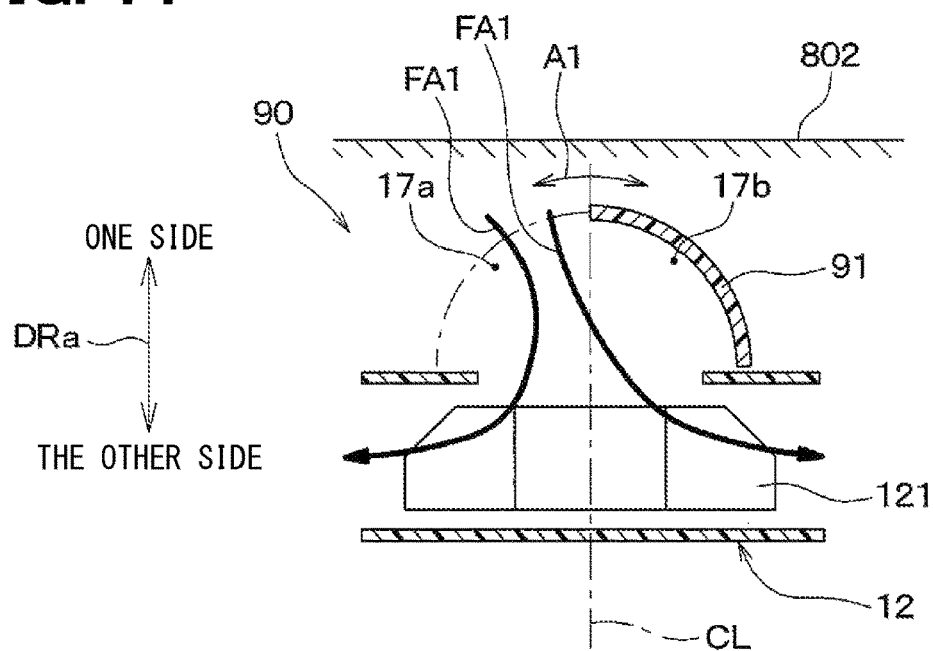
FIG. 14 is a schematic cross-sectional view of an overall configuration of a seat air-conditioner of a first comparative example.

Here, the present embodiment will be described compared to a first comparative example and a second comparative example. As shown in FIG. 14, a seat air-conditioner 90 of the first comparative example includes a door device 91 configured to open and close the first inlet 17a and the second inlet 17b in place of the door device 19 of the present embodiment. The door device 91 is configured as a single rotary door having a gate shape such as one used for an air-conditioning unit for a vehicle. The door device 91 opens and closes the first inlet 17a and the second inlet 17b by rotating as shown in an arrow A1.

Figure 15:
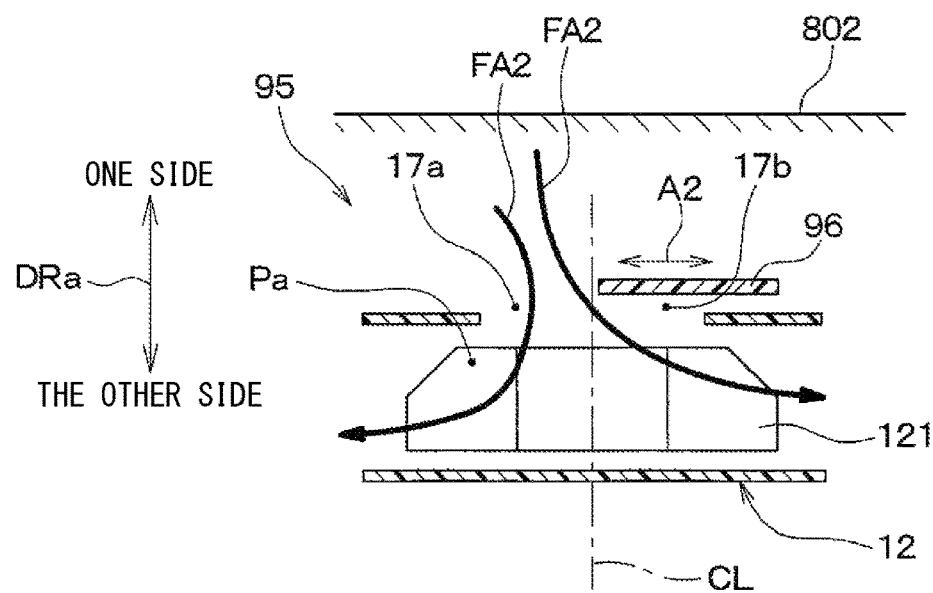
FIG. 15 is a schematic cross-sectional view of an overall configuration of a seat air-conditioner of a second comparative example.

Further, as shown in FIG. 15, a seat air-conditioner 95 of the second comparative example includes a door device 96 configured to open and close the first inlet 17a and the second inlet 17b in place of the door device 19. The door device 96 is configured as a single slide door such as one used for an air-conditioning unit for a vehicle. The door device 96 opens and closes the first inlet 17a and the second inlet 17b by moving straight as shown in an arrow A2.

In the present embodiment, for example, the door device 19 has a substantial cylindrical shape as shown in FIGS. 4 and 6. Thus, the seat air-conditioner 10 can be installed in the seat 80 while the door device 19 has a simple structure having a small dimension in the axial direction DRa compared to the door device 91 of the first comparative example in FIG. 14.

In the first and second comparative examples shown in FIGS. 14 and 15, airflows into the centrifugal fan 121 through the first inlet 17a are not symmetrical but biased relative to the axis CL as shown in arrows FA1 and FA2. Further, the airflows into the centrifugal fan through the second inlet 17b are also biased relative to the axis CL. Therefore, in the first and second comparative examples, the airflows are likely to be separated at a first side portion Pa in the axial direction DRa of spaces between the blades of the centrifugal fan 121.

On the other hand, in the present embodiment, both the air flowing into the centrifugal fan 121 through the first inlets 17a and the air flowing into the centrifugal fan 121 through the second inlets 17b are likely to generate airflows symmetrical relative to the axis CL. Therefore, the above-mentioned separation of the airflows, which may occur in the first and second comparative examples, is more likely to be avoided.

Further, in the present embodiment, a switching configuration of air-conditioning can be achieved without ducts connected to the first inlets 17a and the second inlets 17b. Thus, the present embodiment can meet a request to reduce a thickness of the seat 80. In the seat air-conditioner 10 of the present embodiment, by setting the distance DC between the attachment plate 11 and the housing forming portion 16 in the axial direction DRa to around 20 mm, the second inlets 17b are defined and the door device 19 is configured.

Further, according to the present embodiment, the door device 19 has the drive door 30 having a shape along the inlet portion 17 and configured to rotate about the axis CL. The door device 19 has the driven door 32 that is arranged between the drive door 30 and the inlet portion 17 and configured to be rotated about the axis CL. Therefore, as compared to a case that the door device 19 is configured as a single door, a ventilation area of the fully open first inlet 17a and a ventilation area of the fully open second inlet 17b can be increased. Since the passenger who operates the door device 19 does not need to operate directly the driven door 32, the door operating device 22 can have a very simple structure.

Further, according to the present embodiment, the door device 19 is configured to open and close the first inlets 17a as shown in FIGS. 11A to 11D. That is, the door device 19 is configured to open the first inlets 17a by having the first inlets 17a, the drive door front openings 301a, and the driven door front openings 321a aligned to define the through holes by the first inlets 17a, the drive door front openings 301a, and the driven door front openings 321a. Further, the door device 19 is configured to close the first inlets 17a by moving the drive door front walls 301b and the driven door front walls 321b such that the drive door front walls 301b and the driven door front walls 321b are offset from each other, the drive door front walls 301b are aligned with the first inlets 17a, and the driven door front walls 321b are aligned with the first inlets 17a. Therefore, a rotation of the drive door 30 and a rotation of the driven door 32 are appropriately utilized to increase the ventilation area of the fully open first inlets 17a.

Further, according to the present embodiment, as shown in FIGS. 8 and 12, the door device 19 is configured to increase the overlapping area WL1 between the drive door front walls 301b and the first inlet walls 171b as increasing the opening degree of the first inlets 17a. Therefore, the first inlet walls 171b can rotatably support the door device 19 and the ventilation area of the fully open first inlets 17a can be increased by having the drive door front walls 301b aligned with the first inlet walls 171b.

Further, according to the present embodiment, the door device 19 is configured to open and close the second inlets 17b as shown in FIGS. 11A to 11D. That is, the door device 19 is configured to open the second inlets 17b by having the second inlets 17b, the drive door side openings 302a, and the driven door side openings 322a aligned with each other to define through holes by the second inlets 17b, the drive door side openings 302a, and the driven door side openings 322a. Further, the door device 19 is configured to close the second inlets 17b by moving the drive door side walls 302b and the driven door side walls 322b such that the drive door side walls 302b and the driven door side walls 322b are offset from each other in the circumferential direction DRc, the drive door side walls 302b are aligned with the second inlets 17b, and the driven door side walls 322b are aligned with the second inlets 17b.

Therefore, the rotation of the drive door 30 and the rotation of the driven door 32 can be appropriately utilized to increase the ventilation area of the fully open second inlets 17b.

Further, according to the present embodiment, as shown in FIGS. 8 and 13, the door device 19 is configured to increase the overlapping area WL2 between the drive door side walls 302b and the second inlet walls 172b as increasing the opening degree of the second inlets 17b. Therefore, the second inlet walls 172b can connect the first inlet portion 171 to the blower 12 and the ventilation area of the fully open second inlets 17b can be increased by having the drive door side walls 302b aligned with the second inlet walls 172b.

Further, according to the present embodiment, as shown in FIGS. 11A to 11D, the drive door 30 is configured to cover the inlet portion 17 and decrease an opening degree of the second inlets 17b as rotating in the first direction of the circumferential direction DRc. The drive door side portion 302 includes the first drive protrusions 302e each protruding radially inward from the one end portion 302c of the drive door side wall 302b and the second drive protrusions 302f each protruding radially inward from the other end portion 302d of the drive door side wall 302b. Then, when the drive door 30 rotates in the second direction of the circumferential direction DRc, the driven door 32 is rotated in the second direction of the circumferential direction DRc by the first drive protrusions 302e pushing portions of the driven door 32. When the drive door 30 rotates in the first direction of the circumferential direction DRc, the drive door 30 rotates the driven door 32 in the first direction of the circumferential direction DRc by the second drive protrusions 302f pushing portions of the driven door 32.

Therefore, the driven door 32 can be rotated in association with the rotation of the driven door 32 with the first drive protrusions 302e and the second drive protrusions 302f. Then, for example, when the second inlets 17b are fully opened, an area in the circumferential direction DRc occupied by the drive door side walls 302b and the driven door side walls 322b can be decreased compared to a case that the second inlets 17b are fully closed. Therefore, it is possible to secure a large increase/decrease range of the ventilation area of the second inlets 17b.

Further, both the first drive protrusions 302e and the second drive protrusions 302f protrude inward in the radial direction DRr. Therefore, it is possible to suppress the turbulence of the airflow flowing into the second inlets 17b as compared to a case that the protrusions 302e and 302f protrude outward in the radial direction DRr.

Further, according to the present embodiment, as shown in FIG. 11A, the radially outer portion 302g of the one end portion 302c of each of the drive door side walls 302b has curved shape and the radially outer portion 302h of the other end portion 302d of the each of the drive door side walls 302b has curved shape. Therefore, as compared to a case that the radially outer portions 302g and 302h are not curved, the airflow flowing into the fully open second inlet 17b can be suppressed.

Further, according to the present embodiment, as shown in FIGS. 11A to 11D, the driven door side portion 322 includes the first driven protrusions 322e each protruding radially outward from the one end portion 322c of the driven door side wall 322b. Then, the driven door 32 is rotated in the second direction of the circumferential direction DRc by the first drive protrusions 302e pushing the first driven protrusions 322e. The driven door 32 is rotated in the first direction of the circumferential direction DRc by the second drive protrusions 302f pushing the first driven protrusions 322e.

Therefore, when the drive door 30 rotates to open the second inlets 17b and the driven door 32 is rotated by the drive door 30, an overlapping area between the drive door side walls 302b and the driven door side walls 322b can be increased. When the drive door 30 rotates to close the second inlets 17b and the drive door 30 is rotated in association with the drive door 30, the overlapping area between the drive door side walls 302b and the driven door side walls 322b can be minimized. Therefore, by fully utilizing an area in the circumferential direction DRc occupied by the drive door side walls 302b and the driven door side walls 322b, a large increase/decrease range of the ventilation area of the second inlets 17b can be secured.

Further, according to the present embodiment, the second inlet portion 172 includes the first stoppers 172e each protruding radially outward from the one end portion 172c of the second inlet wall 172b. Further, the second inlet portion 172 includes the second stoppers 172f each protruding radially outward from the other end portion 172d of the second inlet wall 172b. Then, the first stoppers 172e are configured to stop the rotation of the driven door 32 by interfering with portions of the driven door 32 when the drive door 30 rotates in the first direction of the circumferential direction DRc. On the other hand, the second stoppers 172f are configured to stop the rotation of the driven door 32 by interfering with portions of the driven door 32 when the drive door 30 rotates in the second direction of the circumferential direction DRc.

Therefore, the first stoppers 172e and the second stoppers 172f are configured to stop the rotation of the driven door 32 and the rotation of the drive door 30. Then, for example, when the second inlets 17b are fully opened, an area in the circumferential direction DRc occupied by the second inlet walls 172b and the driven door side walls 322b can be reduced compared to a case that the second inlets 17b are fully closed. Therefore, it is possible to secure a large increase/decrease range of the ventilation area of the second inlets 17b.

Further, both the first stoppers 172e and the second stoppers 172f protrude outward in the radial direction DRr. Therefore, as compared to the case that the stoppers 172e and 172f protrude inward in the radial direction DRr, the airflows generated when the air flows into the radially inner space 172a (see FIG. 6) through the second inlets 17b can be restricted from being disturbed.

Further, as shown in FIG. 11C, when the second inlets 17b are fully closed, the first stoppers 172e and the first drive protrusions 302e of the drive door 30 face each other in the radial direction DRr. At the same time, the second stoppers 172f and the second drive protrusions 302f of the drive door 30 face each other in the radial direction DRr. Therefore, when the second inlets 17b are fully opened, the stoppers 172e and 172f and the protrusions 302e and 302f can restrict the airflow that passes through the drive door side openings 302a, the driven door side openings 322a, and the second inlets 17b from being disturbed.

Further, according to the present embodiment, as shown in FIG. 11A, the radially inner portion 172g of the one end portion 172c of each of the second inlet walls 172b has a curved shape and the radially inner portion 172h of the other end portion 172d of each of the second inlet walls 172b has a curved shape. Therefore, when the second inlets 17b are fully opened, as compared to a case that the radially inner portions 172g and 172h are not curved, the airflow generated when air flows into the second inlet portion 172 through the second inlets 17b in the radial direction DRr is restricted from being disturbed.

Further, according to the present embodiment, in the cross section shown in FIG. 11C, when the door device 19 maximizes the opening degree of the second inlets 17b, each of the driven door side walls 322b is housed within a space surrounded by the first virtual line LT1, the second virtual line LT2, each of the second inlet walls 172b, and each of the driven door side walls 302b.

Here, the first virtual line LT1 is a line passing through both the one end portion 172c of the each of the second inlet walls 172b aligned with the each of the driven door side walls 322b and the one end portion 302c of the each of the drive door side walls 302b aligned with the each of the driven door side walls 322b. The second virtual line LT2 is a line passing through both the other end portion 172d of the each of the second inlet walls 172b aligned with the each of the driven door side walls 322b and the other end portion 302d of the each of the drive door side walls 302b aligned with the each of the driven door side walls 322b.

Therefore, when the second inlets 17b are fully opened, the driven door 32 can be located at a position such that the driven door side walls 322b do not restrict the airflow passing through the second inlets 17b.

Further, according to the present embodiment, as shown in FIGS. 11A to 11D, the driven door side portion 322 includes the second driven protrusions 322f each protruding radially inward from the other end portion 322d of the driven door side wall 322b. Then, the driven door 32 can be stopped to be rotated in the first direction of the circumferential direction DRc when the first stoppers 172e come into contact with the second driven protrusions 322f. On the other hand, the driven door 32 is stopped to be rotated in the second direction of the circumferential direction DRc when the second stoppers 172f come into contact with the second driven protrusions 322f.

Therefore, when the second inlets 17b are fully opened, the driven door 32 is stopped to be rotated in the second direction of the circumferential direction DRc while the driven door side walls 322b and the second inlet walls 172b are overlapped as much as possible. On the other hand, when the second inlets 17b are fully closed, the overlapping area between the driven door side walls 322b and the second inlet walls 172b is minimized and the driven door 32 is stopped to be rotated in the first direction of the circumferential direction DRc. Therefore, by fully utilizing an area in the circumferential direction DRc occupied by the driven door side walls 322b and the second inlet walls 172b, the increase/decrease range of the ventilation area of the second inlets 17b can be secured.

Further, according to the present embodiment, as shown in FIGS. 2, 6 and 8, the first inlet portion 171 and the second inlet portion 172 are disposed between the passenger supporting portion 802 of the seat 80 and the centrifugal fan 121 of the blower 12. When the door device 19 maximizes the opening degree of the first inlets 17a, the radially inner space 172a defined inside of the second inlet portion 172 serves as a ventilation passage extending along the axis CL. In that case, the radially inner space 172a serves as a rectifying section to make an airflow generated when the air is drawn into the blower 12 through the first inlets 17a straight, thereby rectifying the airflow.

Therefore, it is possible to suppress a bias of the air volume distribution between the blades of the centrifugal fan 121, and the air volume distribution can be uniform. Specifically, the tendency in the air volume distribution between the blades, which is the amount of air increases in a direction away from the blower inlet 12a in the axial direction DRa, can be moderate and the air volume distribution between the blades is close to be uniform. As a result, it is possible to improve the performance of the blower 12 such as the pressure characteristic and the reduction of noise of the blower 12.

Further, according to the present embodiment, the first inlets 17a open toward the passenger supporting portion 802 from inside of the seat 80. The second inlets 17b open toward a portion of the seat surface 801 other than the passenger supporting portion 802 from inside of the seat 80. Therefore, due to the difference between the direction in which the first inlets 17a open and the direction in which the second inlets 17b open, the second inlets 17b can be easily arranged such that the air drawn into the seat 80 through the portion of the seat surface 801 other than the passenger supporting portion 802 is more likely to flow into the second inlets 17b than into the first inlets 17a.

Second Embodiment

A second embodiment of the present disclosure will be described next. The present embodiment will be explained primarily with respect to portions different from those of the first embodiment. In addition, explanations of the same or equivalent portions as those in the above embodiment will be omitted or simplified. The same applies to descriptions of embodiments which will be described later.

Figure 16:
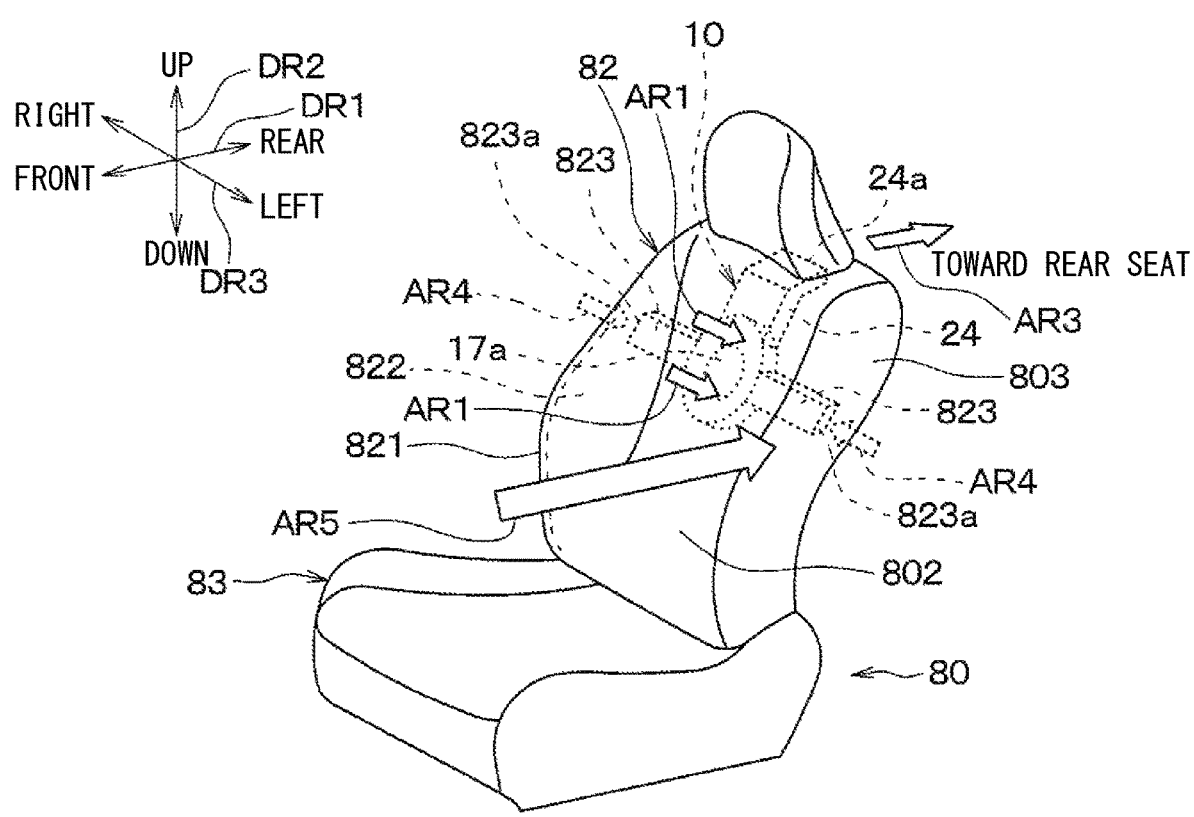
FIG. 16 is a perspective view of the seat including a seat air-conditioner of a second embodiment corresponding to FIG. 1.

As shown in FIG. 16, in the present embodiment, ventilation passages 823 are disposed inside the seat 80. In this point, the present embodiment is different from the first embodiment.

Specifically, the ventilation passages 823 of FIG. 16 are disposed inside the seat back 82 of the seat 80. Air flows into the ventilation passages 823 through portions of the seat surface 801 other than the passenger supporting portion 802. In the present embodiment, air flows into the ventilation passages 823 through the side portion 803 of the seat 80 that is outside of the passenger supporting portion 802 as shown in arrows AR4. That is, air inlets 823a of the ventilation passages 823 are defined in the side portion 803 of the seat 80. Each of the ventilation passages 823 may be formed by a duct, or may be formed by hollowing out a portion of the seat back elastic member 822.

Further, inside the seat 80, the first inlets 17a and the second inlets 17b are arranged such that the air flowing into the ventilation passages 823 is more likely to flow into the second inlets 17b (see FIG. 6) than into the first inlets 17a. In short, the ventilation passages 823 have downstream ends connected to the second inlets 17b not the first inlets 17a.

Further, since the breathable seat back skin 821 covers the air inlets 823a of the ventilation passages 823, the air flowing through the seat back skin 821 flows into the ventilation passages 823. For example, when the area around the seat 80, which is the front seat, is air-conditioned, a part of the conditioned air indicated by an arrow AR5 flows into the ventilation passages 823.

Aside from the above described aspects, the present embodiment is the same as the first embodiment. Further, in the present embodiment, the same effects as the first embodiment described above can be obtained in the same manner as in the first embodiment.

Further, according to the present embodiment, the ventilation passages 823 are provided inside the seat 80, and air flows into the ventilation passages 823 through portions of the seat surface 801 other than the passenger supporting portion 802. Then, the air having flowed into the ventilation passages 823 is more likely to flow into the second inlets 17b (see FIG. 6) than into the first inlets 17a. Therefore, when the blower 12 draws air from the portion of the seat surface 801 other than the passenger supporting portion 802 through the second inlets 17b, a ventilation resistance in the seat 80 can be reduced.

For example, it is easily achieved to bring a resistance generated when the blower 12 draws the air through the fully open second inlets 17b close to a resistance generated when the blower 12 draws the air through the fully open first inlets 17a. If the resistances are similar, the amount of air drawn by the blower 12 can be stabilized even if the opening degree of the first inlets 17a and the opening degree of the second inlets 17b are changed by the door device 19.

Further, the blower 12 draws the conditioned air flowing through a side of the seat 80 through the ventilation passages 823, so that the air blown out in the rearward direction of the seat 80, i.e., the air blown out toward a rear seat, can have comfortable temperature for a passenger on the rear seat.

Third Embodiment

A third embodiment will be described next. The present embodiment will be explained mainly with respect to portions different from those of the first embodiment.

Figure 17:
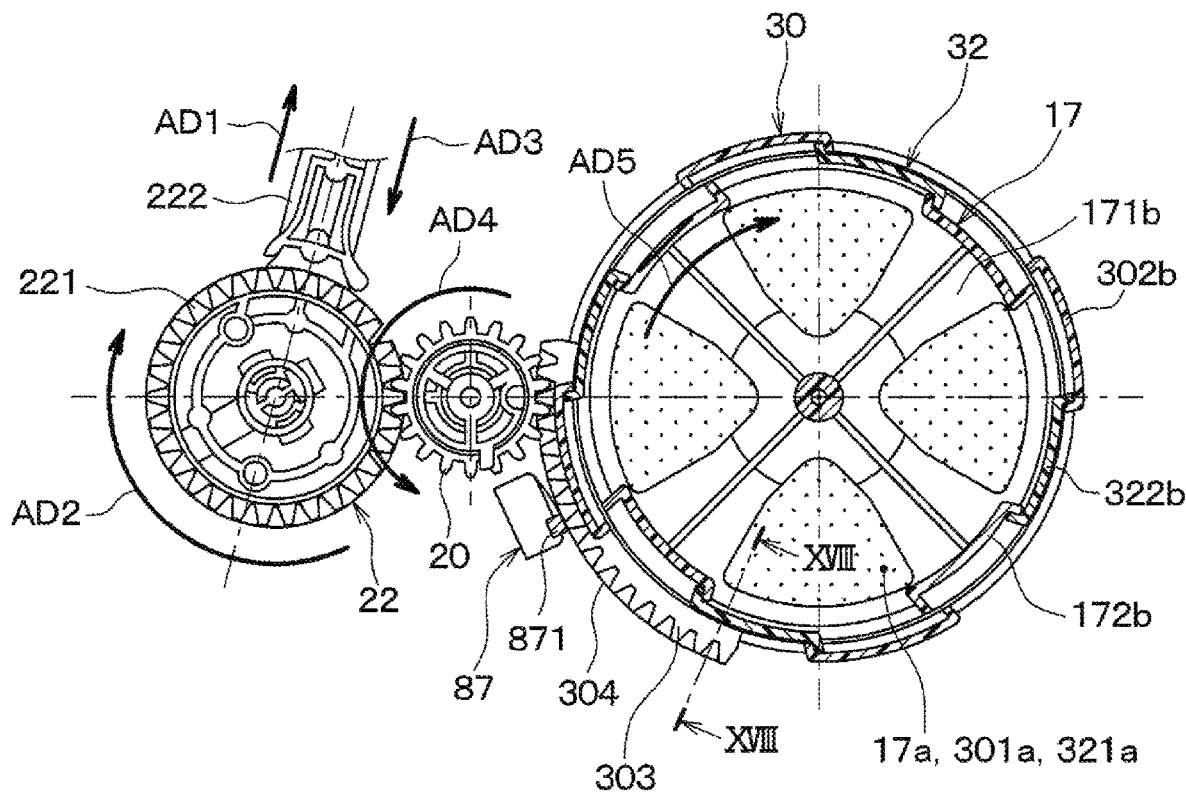
FIG. 17 is a diagram illustrating a positional relationship between a drive door and a blower switch in a third embodiment corresponding to FIG. 10.
Figure 18:
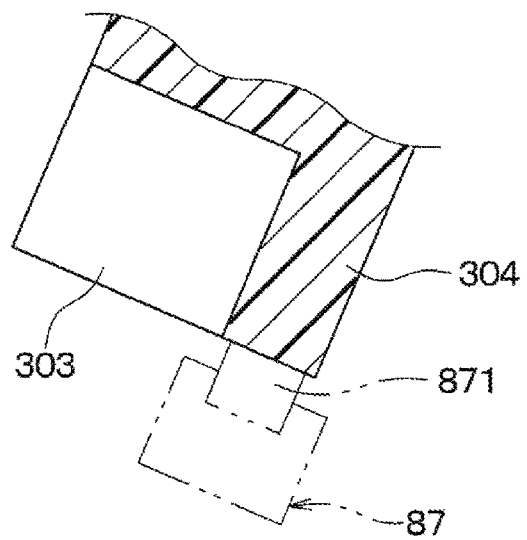
FIG. 18 is a cross-sectional view taken along a line XVIII-XVIII of FIG. 17.

As shown in FIGS. 17 and 18, in the present embodiment, unlike the first embodiment, the blower switch 87 is arranged in the vicinity of the drive door 30. The blower switch 87 is not directly operated by the passenger and switched between an ON state and an OFF state in association with a rotation of the drive door 30. In this embodiment as well as in the first embodiment shown in FIG. 7, when the motor 122 of the blower 12 is turned on, a constant electric power is input into the motor 122.

Specifically, as shown in FIGS. 17 and 18, the drive door 30 of the present embodiment has a switch operating rib 304 as a switch operating unit. The switch operating rib 304 is located at a part of an outer circumference of the drive door 30. The switch operating rib 304 is configured to switch between the ON state and the OFF state of the blower switch 87 by moving in the circumferential direction DRc in association with the rotation of the drive door 30.

Specifically, the blower switch 87 has a switch operated portion 871. When the switch operated portion 871 is pushed by the switch operating rib 304, the blower switch 87 is turned on. On the other hand, when the switch operating rib 304 leaves away from the switch operated portion 871, the blower switch 87 is turned off.

Figures 19, 20:
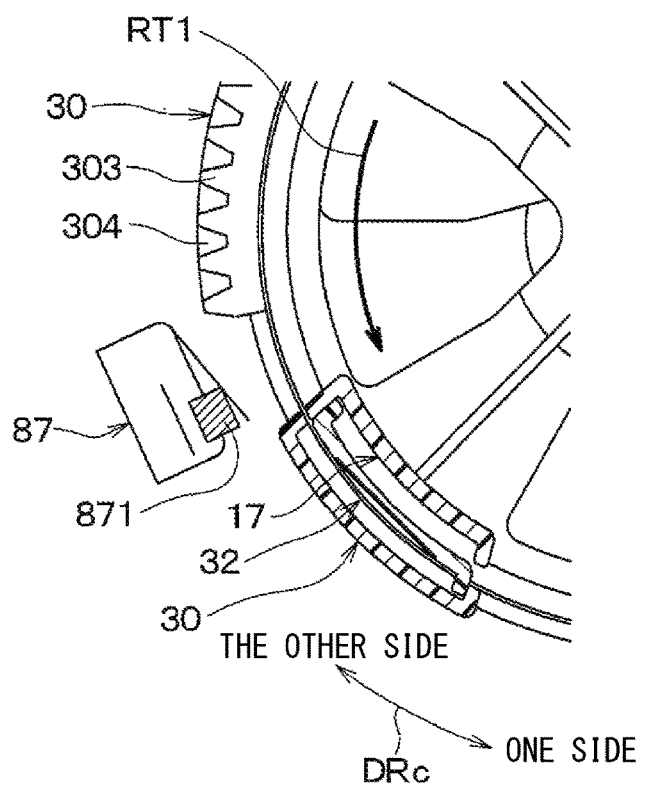
FIG. 19 is a list showing a door connecting gear angle, a drive door angle, a front seat air volume, a blowing air volume toward a rear seat, and a blower operation at each switching position of the door connecting gear.
FIG. 20 is a cross-sectional view illustrating a state where the door connecting gear is positioned at a switching position [5] (i.e., the third state shown in FIG. 11C) and including the blower switch.

In the present embodiment, for example, the door connecting gear 221 is manually rotated from a switching position [1] to a switching position [5] as shown in the table of FIG. 19.

In the table of FIG. 19, the door connecting gear operating angle is the rotation angle of the door connecting gear 221 when the rotation angle of the door connecting gear 221 is defined as 0 degree at the switching position [1]. The drive door angle is a rotation angle of the drive door 30. The drive door 30 rotates within a rotation range between a first position and a second position in the circumferential direction DRc and the drive door angle when the drive door 30 is located at the second position is 0 degree. FIG. 11C is a view illustrating a state where the drive door 30 is located at the second position, i.e., the drive door angle of the drive door 30 is 0 degree. Further, FIGS. 11B and 11D are views illustrating a state where the drive door angle is 30 degrees. Further, FIG. 11A is a view illustrating a state where the drive door 30 is located at the first position in the circumferential direction DRc, i.e., where the drive door angle of the drive door 30 is 60 degrees.

Further, in the table of FIG. 19, the front seat air volume is an amount of air drawn by the blower 12 through the passenger supporting portion 802 of the seat 80 and the first inlets 17a. The front seat air volume is defined as OFF when the first inlets 17a are fully closed or the blower 12 is stopped. The front seat air volume increases as the opening degree of the first inlets 17a increases when the blower 12 is operating. "Lo", "M1", "M2", and "Hi" in the front seat air volume all indicate that the front seat air volume is larger than zero. Further, the "Lo", "M1", "M2", and "Hi" also indicate the magnitude relationship of the front seat air volume of "Lo<M1<M2<Hi".

Further, the blowing air volume toward the rear seat in FIG. 19 is an amount of air blown out through the rearward blowing outlet 24a of the blower duct 24. "OFF" of the blowing air volume toward the rear seat indicates that air is not blown through the rearward blowing outlet 24a and "Hi" of the blowing air volume toward the rear seat indicates that a predetermined amount of air is blown out through the rearward blowing outlet 24a. Further, "ON" of the blower 12 in the table of FIG. 19 indicates that the blower 12 is operating, that is, the blower switch 87 is turned on. Further, "OFF" of the blower 12 indicates that the blower 12 is stopped, that is, the blower switch 87 is turned off.

For example, FIG. 20 is a view illustrating a state where the door connecting gear 221 is positioned at the switching position [5], i.e., the drive door 30 is located at the second position in the circumferential direction DRc. In this case, since the switch operating rib 304 leaves away from the switch operated portion 871, the blower switch 87 is turned off.

Figure 21:
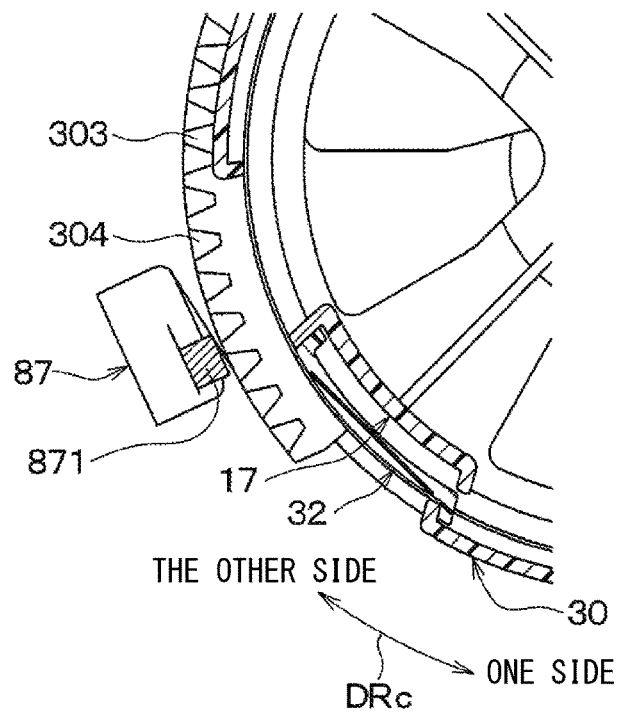
FIG. 21 is a cross-sectional view illustrating a state where the door connecting gear is positioned at a switching position [3] (i.e., the fourth state shown in FIG. 11D) from the switching position [5] and including the blower switch.

Further, FIG. 21 is a view illustrating a state where a position of the door connecting gear 221 is switched to the switching position [3] from the switching position [5]. In this case, the blower switch 87 is turned on. That is, as shown in FIGS. 20 and 21, the switch operating rib 304 is configured to turn the blower switch 87 on in association with the drive door 30 rotating in the first direction of the circumferential direction DRc from the second position as shown in an arrow RT1.

Figure 22:
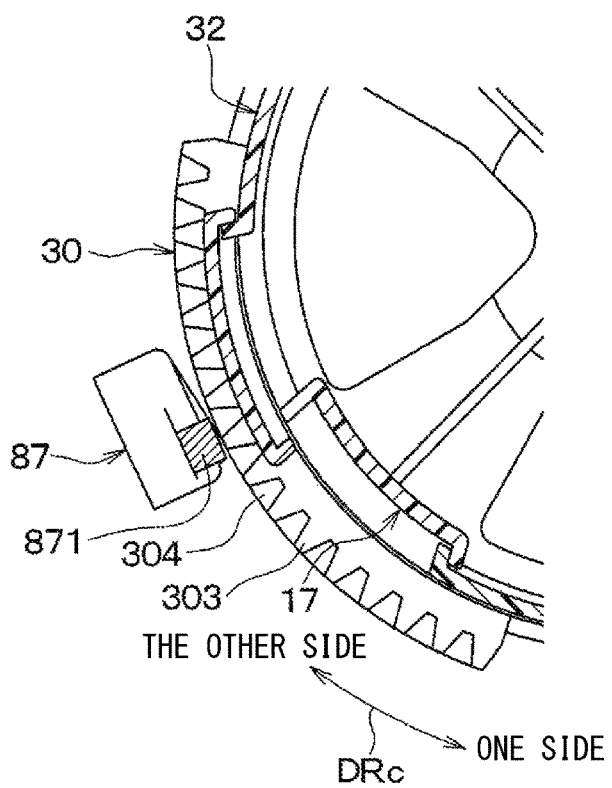
FIG. 22 is a cross-sectional view illustrating a state where the door connecting gear is positioned at a switching position [1] (i.e., the first state shown in FIG. 11A) and including the blower switch.

Further, FIG. 22 is a view illustrating a state where the drive connection gear 221 is positioned at the switching position [1], i.e., where the drive door 30 is rotating to the first position in the circumferential direction DRc. Also in this case, the blower switch 87 is in the ON state. As described above, the blower switch 87 is turned off at the switching position [5] in FIG. 19, and the blower switch 87 is turned on at the switching positions [1] to [4].

Aside from the above described aspects, the present embodiment is the same as the first embodiment. Further, in the present embodiment, the same effects as the first embodiment described above can be obtained in the same manner as in the first embodiment.

Further, according to the present embodiment, as shown in FIGS. 20 to 22, the drive door 30 has a switch operating rib 304 as a switch operating unit. The switch operating rib 304 is configured to switch between the ON state and the OFF state of the blower switch 87 by moving in the circumferential direction DRc in association with the rotation of the drive door 30. When the drive door 30 is located at the second position in the circumferential direction DRc, the switch operating rib 304 turns off the blower switch 87. Further, the switch operating rib 304 turns on the blower switch 87 when the drive door 30 rotates in the first direction of the circumferential direction DRc to leave the second position.

Thus, there is an advantage that it is not necessary to arrange the blower operation switching unit operated by the passenger to turn on and off the blower 12 in the seat 80 in which the seat air-conditioner 10 is mounted. For example, by simply arranging two power supply wirings connecting between the motor 122 of the blower 12 and the vehicle power supply 86 and the wires of the door operating device 22 in the seat back 82, a system configuration to manually switch between an ON and OFF state of the blower 12, stop the seat air-conditioning, and adjust the air volume can be achieved.

Note that the present embodiment is a modification based on the first embodiment, but it is possible to combine the present embodiment with the second embodiment described above.

Fourth Embodiment

A fourth embodiment will be described next. The present embodiment will be explained mainly with respect to portions different from those of the first embodiment.

Figure 23:
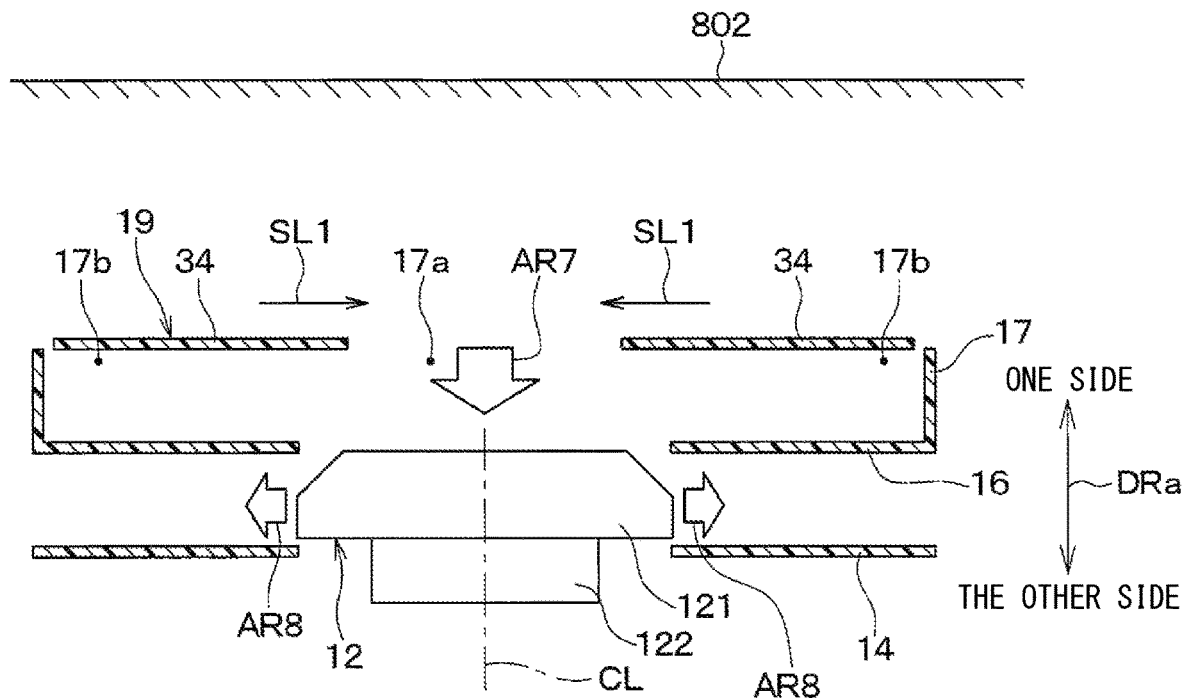
FIG. 23 is a schematic cross-sectional view in a fourth embodiment illustrating a state where a pair of switching doors fully open a first inlet and fully close a second inlet.
Figure 24:
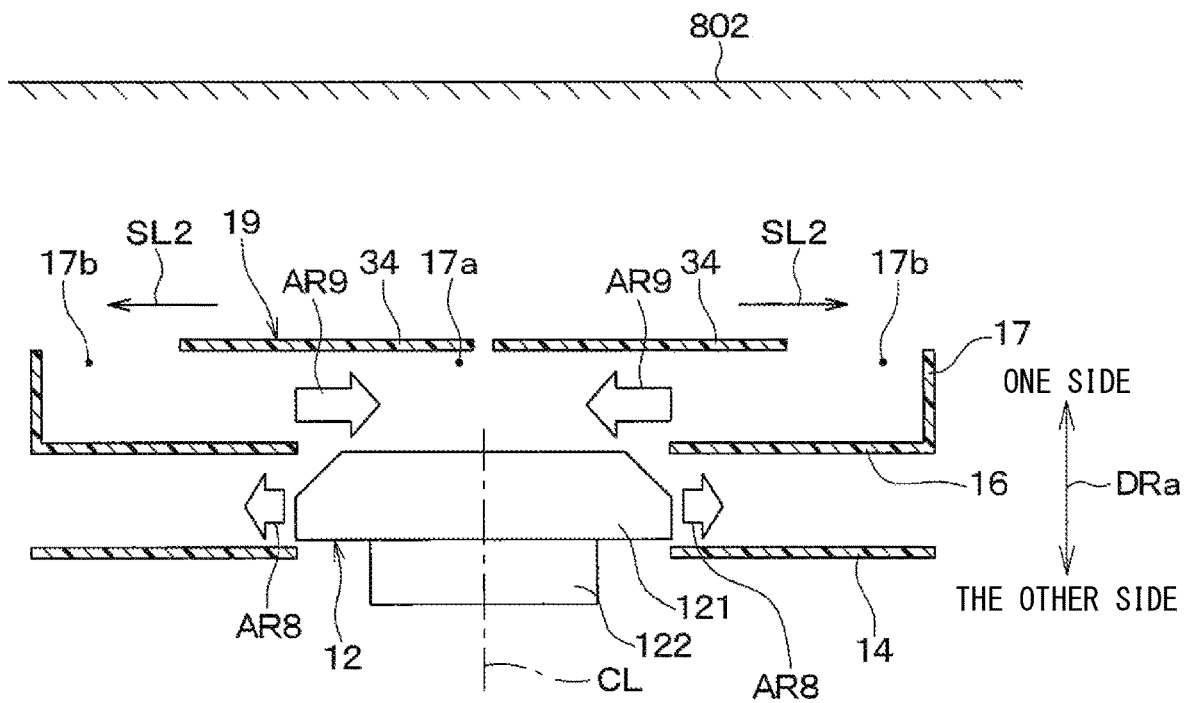
FIG. 24 is a schematic cross-sectional view in the fourth embodiment illustrating a state where the pair of switching doors fully close the first inlet and fully open the second inlet.

As shown in FIGS. 23 and 24, in the present embodiment, the door device 19 has a pair of switching doors 34 in place of the drive door 30 and the driven door 32 that are rotating doors.

Further, the second inlets 17b open in the axial direction DRa, which is different from the first embodiment. However, as in the first embodiment, air flows into the second inlets 17b through a portion of the seat surface 801 other than the passenger supporting portion 802. For example, by providing the ventilation passages 823 shown in FIG. 16 inside the seat 80, air can be guided into the second inlets 17b through the portion of the seat surface 801 other than the passenger supporting portion 802.

As shown in FIGS. 23 and 24, the pair of switching doors 34 are flat plate sliding doors that reciprocate along a linear path. The pair of switching doors 34 are configured to open and close the first inlet 17a and the second inlets 17b by symmetrically moving in a direction intersecting the axis CL (specifically, one direction of the radial direction DRr) with respect to the axis CL.

In FIG. 23, the pair of switching doors 34 fully open the first inlet 17a and fully close the second inlets 17b. In the state shown in FIG. 23, air is drawn into the centrifugal fan 121 through the first inlet 17a and the drawn air is blown out in the radial direction DRr by the centrifugal fan 121 as shown in arrows AR8. Then, the air blown out by the centrifugal fan 121 is blown in the rearward direction of the seat 80 through the blower duct 24 as in the first embodiment.

When the pair of switching doors 34 slide to approach each other as shown in arrows SL1 from the state shown in FIG. 23, the pair of switching doors 34 are in the state shown in FIG. 24. In FIG. 24, the pair of switching doors 34 fully close the first inlet 17a and fully open the second inlets 17b. In the state shown in FIG. 24, the air is drawn into the centrifugal fan 121 through the second inlets 17b as shown in arrows AR9 and the drawn air is blown out in the radial direction DRr by the centrifugal fan 121 as shown in the arrows AR8. Then, the air blown out by the centrifugal fan 121 is blown out in the rearward direction of the seat 80 through the blower duct 24.

Further, when the pair of switching doors 34 slide to move away from each other as shown in arrows SL2 from the state shown in FIG. 24, the pair of switching doors 34 are positioned as shown in FIG. 23.

Aside from the above described aspects, the present embodiment is the same as the first embodiment. Further, in the present embodiment, advantages obtained by the same configuration as the first embodiment described above can be obtained in the same manner as in the first embodiment.

Further, according to the present embodiment, the pair of switching doors 34 are configured, by symmetrically moving in the direction intersecting the axis CL with respect to the axis CL, to open the first inlet 17a while closing the second inlets 17b and to close the first inlet 17a while opening the second inlets 17b. Therefore, similarly to the first embodiment, it is possible to restrict the centrifugal fan 121 from drawing biased airflow with respect to the axis CL as shown in the arrows FA2 in FIG. 15.

Note that the present embodiment is a modification based on the first embodiment, but it is possible to combine the present embodiment with the second embodiment described above.

Other Embodiments (1) In each of the above-described embodiments, as shown in FIG. 1, the seat air-conditioner 10 is disposed in the seat back 82, but may be disposed inside of the seat portion 83 instead of the seat back 82.

(2) In each of the above-described embodiments, as shown in FIG. 8, the first inlets 17a and the second inlets 17b are defined in the inlet portion 17 as different openings. However, this is an example. For example, in the inlet portion 17, the first inlets 17a and the second inlets 17b may be fluidly connected to each other.

(3) In each of the above-described embodiments, as shown in FIG. 8, the door device 19 can continuously change the opening degree of the first inlets 17a from the fully open state to the fully closed state. However, it is not necessary that the opening degree of the first inlets 17a can be continuously changed. For example, the door device 19 may selectively switch between the fully open state and the fully closed state of the first inlets 17a. This also applies to the opening and closing of the second inlets 17b.

(4) In each of the above-described embodiments, as shown in FIG. 8, the door device 19 has the drive door 30 and the driven door 32, but the driven door 32 may not be provided. Further, the door device 19 may have multiple driven doors 32, or may have multiple drive doors 30.

(5) In each of the above-described embodiments, as shown in FIG. 8, the drive door 30 and the driven door 32 are configured to cover the inlet portion 17. However, it is an example. For example, the drive door 30 and the driven door 32 may be provided inside the inlet portion 17 and the driven door 32 may cover the outside of the drive door 30 and the inlet portion 17 may cover the outside of the driven door 32.

(6) In the fourth embodiment described above, as shown in FIG. 23, the pair of switching doors 34 are flat plate sliding doors that reciprocate along a linear path. However, it is only an example. For example, the pair of switching doors 34 may be rotary doors having gate shapes as shown in FIG. 14, as long as their installation spaces are secured.

(7) In each of the above-described embodiments, as shown in FIG. 4, the blower 12 and the door device 19 are configured to be supported by the attachment plate 11, but they may be supported by a seat frame of the seat 80 without through the attachment plate 11.

(8) In the first embodiment described above, as shown in FIG. 10, the door device 19 is manually operated by a passenger. However, it is an example. For example, a servomotor connected to the drive door 30 may be provided and the door device 19 may be operated by the servomotor.

(9) In each of the above-described embodiments, as shown in FIG. 7, the motor 122 of the blower 12 is selectively switched between ON and OFF state and the rotational speed of the motor 122 is not controlled. However, it is an example. For example, a controller capable of continuously changing the rotational speed of the motor 122 may be provided and the amount of air blown out in the rearward direction of the seat 80 may be adjusted by the controller.

(10) In the first embodiment described above, as shown in FIG. 4, the drive door 30 and the driven door 32 are connected to the inlet portion 17 with the attachment screw 191. However, they may be connected to the inlet portion 17 with a pin or a fixing tab in place of the attachment screw 191. This also applies to an attachment of the intermediate gear 20.

(11) In the first embodiment described above, as shown in FIG. 10, the door connecting gear 221 of the door operating device 22 meshes with the drive gear 303 via the intermediate gear 20. However, the door connecting gear 221 may directly mesh with the drive gear 303 without through the intermediate gear 20.

(12) In each of the above-described embodiments, as shown in FIG. 6, the centrifugal fan 121 is a turbofan, but the present disclosure is not limited to this. The centrifugal fan 121 may be a centrifugal fan having sirocco blades. Further, the blower 12 is a centrifugal blower in the present disclosure, but the present disclosure is not limited to a centrifugal blower. The blower 12 may be an axial blower.

(13) In each of the above-described embodiments, as shown in FIG. 4, the blower housing 13 is not spiral, but may be a scroll casing that collects air in a spiral manner.

(14) In each of the above-described embodiments, as shown in FIG. 8, each of the drive door side openings 302a has a notch shape in which the other side in the axial direction DRa is open. However, each of the drive door side openings 302a may be a hole. This also applies to shapes of the driven door side openings 322a.

(15) In the third embodiment described above, as shown in FIG. 19, when the front seat air volume is "OFF", both the blowing air volume toward the rear seat is "OFF" and the operation of the blower is "OFF". However, the present disclosure is not limited to this. For example, in addition to the switching positions [1] to [5] of the door connecting gear 221 shown in the table of FIG. 19, the door connecting gear 221 may have another switching position that the front seat air volume is "OFF", the blowing air volume toward the rear seat is "Hi", and the blower is "ON".

(16) Note that the present disclosure is not limited to the embodiments described above, and can be variously modified. The above embodiments are not independent from each other, and can be appropriately combined except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like.

Further, in each of the embodiments described above, when numerical values such as the number, numerical value, quantity, range, and the like of the constituent elements of the embodiments are referred to, except in the case where the numerical values are expressly indispensable in particular, the case where the numerical values are obviously limited to a specific number in principle, and the like, the present disclosure is not limited to the specific number. Further, in each of the embodiments described above, when materials, shapes, positional relationships, and the like, of the components and the like, are mentioned, they are not limited to these materials, shapes, positional relationships, and the like, unless otherwise specified and unless limited to specific materials, shapes, positional relationships, and the like.

(Overview)

According to the first aspect shown in a part or all of the above embodiments, a door device is configured to be moved to open a first inlet while closing a second inlet and to close the first inlet while opening the second inlet. The first inlet is arranged such that an air drawn into the seat through a passenger supporting portion is drawn into a blower through the first inlet. The second inlet is arranged such that the an air drawn into the seat through a portion of a seat surface other than the passenger supporting portion is more likely to be drawn into the second inlet than into the first inlet.

Further, according to the second aspect, the door device is configured to be moved to increase an opening degree of the first inlet as decreasing an opening degree of the second inlet. Thus, it is possible to increase and decrease the amount of air drawn into the seat through the passenger supporting portion by the operation of the door device while keeping a predetermined amount of the air blown out by the blower.

Further, according to the third aspect, the inlet portion includes a first inlet portion defining the first inlet and the second inlet portion defining the second inlet. The second inlet portion has a tubular shape extending toward the passenger supporting portion. The first inlet portion extends from a position of the second inlet portion near the passenger supporting portion into an inner space of the second inlet portion in a radial direction DRr. Then, the door device is configured to open and close the first inlet and the second inlet by rotating about an axis of the second inlet portion.

Therefore, it is easy to arrange the first inlet and the second inlet such that the first inlet opens toward the passenger supporting portion from the inside of the seat and the second inlet opens toward the portion of the seat other than the passenger supporting portion. As a result, the second inlet can be arranged such that the air drawn into the seat through the portion other than the passenger supporting portion is more likely to be drawn into the second inlet than into the first inlet. Then, the first inlet and the second inlet can be arranged in a small space.

Further, according to the fourth aspect, the door device includes a drive door and a driven door. The drive door has a shape corresponding to the inlet portion and rotates about the axis. The driven door is disposed between the drive door and the inlet portion and configured to be rotated about the axis by the drive door. Therefore, it is possible to increase a ventilation area of the fully open first inlet and a ventilation area of the fully open second inlet compared to a case that a door device is configured as a single door.

Further, according to the fifth aspect, the drive door includes a drive door front portion having a shape corresponding to the first inlet portion. The drive door front portion includes drive door front walls arranged in a circumferential direction about the axis at specified intervals and drive door front openings defined between the drive door front walls. The driven door includes a driven door front portion disposed between the drive door front portion and the first inlet portion. The driven door front portion includes driven door front walls arranged in the circumferential direction at specified intervals and driven door front openings defined between the driven door front walls. The door device is configured to open the first inlet by having the drive door front openings, the driven door front openings, and the first inlet be aligned with each other in an axial direction to fluidly communicate between the first inlet, drive door front openings, and the driven door front openings. On the other hand, the door device is configured to close the first inlet by moving the drive door front walls and the driven door front walls so that the drive door front walls and the driven door front walls are offset from each other in the circumferential direction, the drive door front walls are aligned with the first inlet in the axial direction, and the driven door front walls are aligned with the first inlet in the axial direction.

Therefore, the rotations of the drive door and the driven door can be appropriately utilized to increase the ventilation area of the fully open first inlet.

Further, according to the sixth aspect, the first inlet portion includes first inlet walls arranged in the circumferential direction at specified intervals. The door device is configured to increase an opening degree of the first inlet by increasing an overlapping area between the drive door front walls and the first inlet walls. Therefore, the door device can be rotatably supported by the first inlet walls and increase the ventilation area of the fully open first inlet by having the first inlet walls and the drive door front walls be aligned with each other in the axial direction.

Further, according to the seventh aspect, the drive door includes a drive door side portion having a shape corresponding to the second inlet portion. The drive door side portion includes drive door side walls arranged in the circumferential direction at specified intervals and drive door side openings defined between the drive door side walls. The driven door includes a driven door side portion disposed between the drive door side portion and the second inlet portion. The drive door side portion includes drive door side walls arranged in the circumferential direction at specified intervals and driven door side openings defined between the driven door side walls. The door device is configured to open the second inlet by having the drive door side openings, the driven door side openings, and the second inlet be aligned with each other in the radial direction to fluidly communicate between the second inlet, the drive door side openings, and the driven door side openings. On the other hand, the door device is configured to close the second inlet by moving the drive door side walls and the driven door side walls to be offset from each other in the circumferential direction so that the drive door side walls are aligned with the second inlet in the radial direction and the driven door side walls are aligned with the second inlet in the radial direction.

Therefore, the rotations of the drive door and the driven door can be appropriately utilized to increase the ventilation area of the fully open second inlet.

Further, according to the eighth aspect, the second inlet portion includes second inlet walls arranged in the circumferential direction at specified intervals. Then, the door device is configured to increase an opening degree of the second inlet by increasing an overlapping area between the drive door side walls and the second inlet walls. Therefore, the second inlet walls can connect between the first inlet portion and the blower and the ventilation area of the fully open second inlet 17b can be increased by overlapping between the second inlet walls and the drive door side walls.

Further, according to the ninth aspect, the drive door is configured to cover the inlet portion. The drive door is configured to decrease an opening degree of the second inlet by rotating in a first direction of the circumferential direction. Each of the drive door side walls includes one end portion and the other end portion in the circumferential direction, a first drive protrusion protruding radially inward from the one end portion, and a second drive protrusion protruding radially inward from the other end portion. Then, the drive door is configured to rotate the driven door in a second direction of the circumferential direction opposite to the first direction by the first drive protrusion pushing the driven door. On the contrary, the drive door is configured to rotate the driven door in the first direction of the circumferential direction by the second drive protrusion pushing the driven door.

Thus, the first drive protrusion and the second drive protrusion can rotate the driven door in association with the rotation of the drive door. Then, for example, when the second inlet is fully opened, an area in the circumferential direction occupied by the drive door side walls and the driven door side walls can be reduced compared with a case that the second inlet is fully closed. Therefore, it is possible to secure a large increase/decrease range of the ventilation area of the second inlet.

Further, according to the tenth aspect, the one end portion of each of the drive door side walls includes a radially outer portion having a curved shape and the other end portion of each of the drive door side walls includes a radially outer portion having a curved shape. Thus, the airflow flowing through the second inlet can be restricted from being disturbed compared to a case that the radially outer portions of the one end portion and the other end portion do not have curved shapes.

Further, according to the eleventh aspect, each of the driven door side walls includes one end portion in the circumferential direction and a first driven protrusion protruding radially outward from the one end portion of the each of the driven door side walls. Then, the driven door is configured to be rotated in the second direction of the circumferential direction by the first drive protrusion pushing the first driven protrusion. The driven door is configured to be rotated in the first direction of the circumferential direction by the second drive protrusion pushing the first driven protrusion.

Thus, when the drive door rotates to open the second inlet and the driven door is rotated by the drive door, an overlapping area between the drive door side walls and the driven door side walls can be increased as much as possible. On the other hand, when the drive door rotates to close the second inlet and the driven door is rotated by the drive door, an overlapping area between the drive door side walls and the driven door side walls can be decreased as much as possible. Therefore, a large increase/decrease range of the ventilation area of the second inlet can be secured by utilizing an area occupied by the drive door side walls in the circumferential direction and an area occupied by the driven door side walls in the circumferential direction.

Further, according to the twelfth aspect, the drive door is configured to cover the inlet portion. The drive door is configured to decrease an opening degree of the second inlet by rotating in the first direction of the circumferential direction. Each of the second inlet walls of the second inlet portion includes one end portion and the other end portion in the circumferential direction, a first stopper protruding radially outward from the one end portion, and a second stopper protruding radially outward from the other end portion. Then, the first stopper of the each of the second inlet walls of the second inlet portion is configured to stop the driven door that is being rotated in the first direction by interfering with the driven door. On the other hand, the second stopper of the each of the second inlet walls of the second inlet portion is configured to stop the driven door that is being rotated in the second direction of the circumferential direction opposite to the first direction by interfering with the driven door.

Therefore, the rotation of the driven door can be stopped by the first stopper and the second stopper, thereby stopping the rotation of the drive door. Then, for example, when the second inlet is fully opened, an area in the circumferential direction occupied by the second inlet walls and the driven door side walls as a whole can be reduced compared to a case that the second inlet is fully closed. Therefore, it is possible to secure a large increase/decrease range of the ventilation area of the second inlet.

Further, according to the thirteenth aspect, the one end portion of each of the second inlet walls includes a radially inner portion having a curved shape and the other end portion of the each of the second inlet walls includes a radially inner portion having a curved shape. Therefore, the airflow flowing into the second inlet portion through the second inlet in the radial direction can be restricted from being disturbed compared to a case that the radially inner portions of the one end portion and the other end portion do not have curved shape.

Further, according to the fourteenth aspect, each of the drive door side walls includes one end portion and the other end portion in the circumferential direction. When the door device is in a fully open position where the second inlet portion is fully open by having each of the drive door side walls, each of the driven door side walls, and each of the second inlet walls be aligned with each other, in a cross section perpendicular to the axis, the each of the driven door side walls is housed in an area defined and enclosed by a first virtual line, a second virtual line, the each of the second inlet walls, and the each of the drive door side wall. The first virtual line is a line passing through both the one end portion of the each of the second inlet walls and the one end portion of the each of the drive door side walls. The second virtual line is a line passing through the other end portion of the each of the second inlet walls and the other end portion of the each of the drive door side walls. Thus, when the opening degree of the second inlet is set to a maximum value, the driven door can be arranged such that the driven door side walls do not restrict the airflow from flowing through the second inlet.

Further, according to the fifteenth aspect, each of the driven door side walls includes one end portion and the other end portion in the circumferential direction, and a second driven protrusion protruding radially inward from the other end portion. The driven door is stopped to be rotated in the first direction of the circumferential direction when the first stopper of the each of the second inlet walls interferes with the second driven protrusion of the each of the driven door side walls. The drive door is stopped to be rotated in the second direction of the circumferential direction when the second stopper of each of the second inlet walls interferes with the second driven protrusion of the each of the driven door side walls.

Therefore, when the second inlet is fully opened, the driven door is stopped to be rotated in the second direction of the circumferential direction while the driven door side walls and the second inlet walls overlap with each other as much as possible. On the other hand, when the second inlet is fully closed, the driven door is stopped to be rotated in the first direction while the overlapping portion between the driven door side walls and the second inlet walls are decreased as much as possible. Therefore, a large increase/decrease range of the ventilation area of the second inlet can be secured by appropriately utilizing an area in the circumferential direction occupied by the driven door side walls and an area in the circumferential direction occupied by the second inlet walls.

Further, according to the sixteenth aspect, the seat air-conditioner includes a blower switch configured to switch between an ON and OFF state of the blower. The blower is configured to operate when the blower switch is turned on and stop when the blower switch is turned off. The drive door rotates within a rotation range between a first position and a second position in the circumferential direction and includes a switch operating portion configured to selectively turn on and off the blower switch by moving in the circumferential direction in association of the drive door. Then, the switch operating portion is configured to turn the blower switch off when the drive door reached the second position and turn the blower switch on when the drive door rotates in the first direction of the circumferential direction to leave the second position.

Therefore, there is an advantage that it is not necessary to arrange the blower operation switching unit operated by the passenger to turn on and off the blower in the seat in which the seat air-conditioner is mounted.

Further, according to the seventeenth aspect, the blower includes an impeller configured to draw and blow an air by rotating about the axis. The first inlet portion and the second inlet portion are disposed between the passenger supporting portion and the impeller. When the door device is at a second fully open state where the first inlet is fully open, the radially inner space of the second inlet portion serves as an air passage extending along the axial direction. In this case, the radially inner space of the second inlet portion can serve as a rectifying area in which the air to be drawn into the blower through the first inlet is rectified into a linear flow.

Therefore, it is possible to suppress a bias in air volume distribution between blades of the impeller of the blower and to make the air volume distribution uniform. As a result, it is possible to improve the blower performance such as the pressure characteristics and the reduction of noise of the blower.

Further, according to the eighteenth aspect, the seat defines therein a ventilation passage into which an air flows from the portion of the seat surface other than the passenger supporting portion. The air flowing into the ventilation passage is more likely to flow into the second inlet than into the first inlet. Thus, when the blower draws air from the portion of the seat surface other than the passenger supporting portion through the second inlet, a ventilation resistance inside of the seat can be reduced.

Further, according to the nineteenth aspect, the blower includes an impeller configured to draw and blow an air by rotating about an impeller axis. The door device includes a pair of switching doors configured to, by symmetrically moving with respect to the impeller axis, open the first inlet while closing the second inlet and close the first inlet while opening the second inlet.

Further, according to the twentieth aspect, the first inlet opens toward the passenger supporting portion. The second inlet opens toward the portion of the seat surface other than the passenger supporting portion. Therefore, due to the difference between the direction in which the first inlet opens the direction in which the second inlet opens, air drawn into the seat through the portion other than the passenger supporting portion is more likely to be drawn into the second inlet than into the first inlet.

What is claimed is:

1. A seat air-conditioner disposed in a seat for a passenger in a vehicle cabin, the seat air-conditioner comprising:
   an inlet portion disposed inside the seat and defining a first inlet and a second inlet;
   a blower disposed inside the seat and configured to draw air through at least one of the first inlet and the second inlet and blow out the air in a rearward direction of the seat; and
   a door device configured to be moved:
      to open the first inlet while closing the second inlet; and
      to close the first inlet while opening the second inlet, wherein
   the seat has a seat surface including a passenger supporting portion configured to support a body of the passenger,
   the first inlet is arranged such that an air drawn into the seat through the passenger supporting portion is drawn into the blower through the first inlet, and
   the second inlet is arranged such that an air drawn into the seat through a portion of the seat surface other than the passenger supporting portion is more likely to be drawn into the second inlet than into the first inlet.

2. The seat air-conditioner according to claim 1, wherein the door device is further configured to be moved to increase an opening degree of the first inlet as decreasing an opening degree of the second inlet.

3. The seat air-conditioner according to claim 1, wherein the inlet portion includes a first inlet portion defining the first inlet and a second inlet portion defining the second inlet,
   the second inlet portion has a tubular shape extending toward the passenger supporting portion,
   the first inlet portion extends from a position of the second inlet portion near the passenger supporting portion into a radially inner space of the second inlet portion, and
   the door device is configured to open and close the first inlet and the second inlet by rotating about an axis of the second inlet portion.

4. The seat air-conditioner according to claim 3, wherein the door device includes:
   a drive door having a shape corresponding to the inlet portion and configured to rotate about the axis; and
   a driven door disposed between the drive door and the inlet portion and configured to be rotated about the axis by the drive door.

5. The seat air-conditioner according to claim 4, wherein the drive door includes a drive door front portion having a shape corresponding to the first inlet portion,
   the drive door front portion includes:
      a plurality of drive door front walls arranged in a circumferential direction about the axis at specified intervals; and
      a plurality of drive door front openings defined between the plurality of drive door front walls,
   the driven door includes a driven door front portion disposed between the drive door front portion and the first inlet portion,
   the driven door front portion includes:
      a plurality of driven door front walls arranged in the circumferential direction at specified intervals; and
      a plurality of driven door front openings defined between the plurality of driven door front walls, and
   the door device is configured to:
      open the first inlet by having the plurality of drive door front openings, the plurality of driven door front openings, and the first inlet be aligned with each other to fluidly communicate between the first inlet, the plurality of drive door front openings, and the plurality of driven door front openings; and close the first inlet by moving the plurality of drive door front walls and the plurality of driven door front walls so that the plurality of drive door front walls and the plurality of driven door front walls are offset from each other in the circumferential direction, the plurality of drive door front walls are aligned with the first inlet, and the plurality of driven door front walls are aligned with the first inlet.

6. The seat air-conditioner according to claim 5, wherein the first inlet portion includes a plurality of first inlet walls for the first inlet that are arranged in the circumferential direction, and the door device is configured to increase an opening degree of the first inlet by increasing an overlapping area between the plurality of the drive door front walls and the plurality of first inlet walls.

7. The seat air-conditioner according to claim 4, wherein the drive door includes a drive door side portion having a shape corresponding to the second inlet portion, the drive door side portion includes:
   a plurality of drive door side walls arranged in a circumferential direction about the axis at specified intervals; and
   a plurality of drive door side openings defined between the plurality of drive door side walls, the driven door includes a driven door side portion disposed between the drive door side portion and the second inlet portion, the driven door side portion includes:
   a plurality of driven door side walls arranged in the circumferential direction at specified intervals; and
   a plurality of driven door side openings defined between the plurality of driven door side walls, the door device is configured to:
   open the second inlet by having the plurality of drive door side openings, the plurality of driven door side openings, and the second inlet be aligned with each other to fluidly communicate between the second inlet, the plurality of drive door side openings, and the plurality of driven door side openings; and
   close the second inlet by moving the plurality of drive door side walls and the plurality of driven door side walls to be offset from each other in the circumferential direction so that the plurality of drive door side walls are aligned with the second inlet and the plurality of driven door side walls are aligned with the second inlet.

8. The seat air-conditioner according to claim 7, wherein the second inlet portion includes a plurality of second inlet walls for the second inlet that are arranged in the circumferential direction, and the door device is configured to increase an opening degree of the second inlet by increasing an overlapping area between the plurality of drive door side walls and the plurality of second inlet walls.

9. The seat air-conditioner according to claim 7, wherein the drive door is configured to cover the inlet portion, the drive door is configured to decrease an opening degree of the second inlet by rotating in a first direction of the circumferential direction, each of the plurality of drive door side walls includes:
   one end portion and the other end portion in the circumferential direction;
   a first drive protrusion protruding radially inward from the one end portion; and
   a second drive protrusion protruding radially inward from the other end portion, and the drive door is configured to:
   rotate the driven door in a second direction of the circumferential direction opposite to the first direction by the first drive protrusion pushing the driven door when the drive door rotates in the second direction; and
   rotate the driven door in the first direction of the circumferential direction by the second drive protrusion pushing the driven door when the drive door rotates in the first direction.

10. The seat air-conditioner according to claim 9, wherein the one end portion of the each of the plurality of drive door side walls includes a radially outer portion having a curved shape, and the other end portion of the each of the plurality of drive door side walls includes a radially outer portion having a curved shape.

11. The seat air-conditioner according to claim 9, wherein each of the plurality of driven door side walls includes:
   one end portion in the circumferential direction; and
   a first driven protrusion protruding radially outward from the one end portion of the each of the plurality of driven door side walls, the driven door is configured to:
   be rotated in the second direction of the circumferential direction by the first drive protrusion pushing the first driven protrusion; and
   be rotated in the first direction of the circumferential direction by the second drive protrusion pushing the first driven protrusion.

12. The seat air-conditioner according to claim 8, wherein the drive door is configured to cover the inlet portion, the drive door is configured to decrease an opening degree of the second inlet by rotating in a first direction of the circumferential direction, each of the plurality of second inlet walls of the second inlet portion includes:
   one end portion and the other end portion in the circumferential direction;
   a first stopper protruding radially outward from the one end portion; and
   a second stopper protruding radially outward from the other end portion, the first stopper of the each of the plurality of second inlet walls of the second inlet portion is configured to stop the driven door that is being rotated in the first direction by interfering with the driven door when the drive door rotates in the first direction of the circumferential direction, and the second stopper of the each of the plurality of second inlet walls of the second inlet portion is configured to stop the driven door that is being rotated in a second direction of the circumferential direction opposite to the first direction by interfering with the driven door when the drive door rotates in the second direction of the circumferential direction.

13. The seat air-conditioner according to claim 12, wherein the one end portion of the each of the plurality of second inlet walls includes a radially inner portion having a curved shape, and the other end portion of the each of the plurality of second inlet walls includes a radially inner portion having a curved shape.

14. The seat air-conditioner according to claim 12, wherein each of the plurality of drive door side walls includes one end portion and the other end portion in the circumferential direction, when the door device is in a fully open position where the second inlet is fully open by having each of the plurality of drive door side walls and each of the plurality of driven door side walls be aligned with each other and having the each of the plurality of driven door side walls and each of the plurality of second inlet walls be aligned with each other, in a cross section perpendicular to the axis, a first virtual line is defined as a line passing through both the one end portion of the each of the plurality of second inlet walls and the one end portion of the each of the plurality of drive door side walls, a second virtual line is defined as a line passing through both the other end portion of the each of the plurality of second inlet walls and the other end portion of the each of the plurality of drive door side walls, and the each of the driven door side walls is housed in an area defined and enclosed by the first virtual line, the second virtual line, the each of the plurality of second inlet walls, and the each of the plurality of drive door side walls.

15. The seat air-conditioner according to claim 12, wherein each of the plurality of the driven door side walls includes:
one end portion and the other end portion in the circumferential direction; and
a second driven protrusion protruding radially inward from the other end portion of the each of the plurality of driven door side walls, a rotation of the driven door in the first direction of the circumferential direction is stopped by the first stopper of the each of the plurality of second inlet walls interfering with the second protrusion of the each of the plurality of driven door side walls, and a rotation of the driven door in the second direction of the circumferential direction is stopped by the second stopper of the each of the plurality of second inlet walls interfering with the second protrusion of the each of the plurality of driven door side walls.

16. The seat air-conditioner according to claim 9, further comprising a blower switch, wherein the blower is configured to:
operate when the blower switch is turned on; and
stop when the blower switch is turned off, the drive door includes a switch operating portion configured to selectively turn on and off the blower switch by moving in the circumferential direction in association with a rotation of the drive door, the drive door rotates within a rotation range between a first position and a second position in the circumferential direction, and the switch operating portion is configured to:
turn the blower switch off when the drive door reaches the second position; and
turn the blower switch on when the drive door rotates in the first direction of the circumferential direction to leave the second position.

17. The seat air-conditioner according to claim 3, wherein the blower includes an impeller configured to draw and blow an air by rotating about the axis, the first inlet portion and the second inlet portion are disposed between the passenger supporting portion and the impeller, when the door device is at a second fully open position where the first inlet is fully open, the radially inner space of the second inlet portion serves as an air passage extending along the axis.

18. The seat air-conditioner according to claim 1, wherein the seat defines therein a ventilation passage into which an air flows from the portion of the seat surface other than the passenger supporting portion, and the air flowing into the ventilation passage is more likely to flow into the second inlet than into the first inlet.

19. The seat air-conditioner according to claim 1, wherein the blower includes an impeller configured to draw and blow an air by rotating about an impeller axis, and the door device includes a pair of switching doors configured to, by symmetrically moving with respect to the impeller axis:
open the first inlet and close the second inlet; and
close the first inlet and open the second inlet.

20. The seat air-conditioner according to claim 1, wherein the first inlet opens toward the passenger supporting portion, and the second inlet opens toward the portion of the seat surface other than the passenger supporting portion.

* * * * *